(12) United States Patent
Lester et al.

(10) Patent No.: US 10,407,525 B2
(45) Date of Patent: Sep. 10, 2019

(54) CONTROLLED ARCHITECTURE POLYMERS

(71) Applicant: Avery Dennison Corporation, Glendale, CA (US)

(72) Inventors: Christopher L. Lester, Kingsport, TN (US); William L. Bottorf, Mill Hall, PA (US); Kyle R. Heimbach, Millmont, PA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/426,207

(22) Filed: Feb. 7, 2017

(65) Prior Publication Data

US 2017/0145140 A1 May 25, 2017

Related U.S. Application Data

(63) Continuation of application No. 14/351,686, filed as application No. PCT/US2012/059849 on Oct. 12, 2012, now Pat. No. 9,738,740.

(60) Provisional application No. 61/547,481, filed on Oct. 14, 2011.

(51) Int. Cl.
| | |
|---|---|
| C08F 220/18 | (2006.01) |
| C08F 293/00 | (2006.01) |
| C09J 133/08 | (2006.01) |
| C09J 153/00 | (2006.01) |
| C09J 133/06 | (2006.01) |

(52) U.S. Cl.
CPC ........ *C08F 220/18* (2013.01); *C08F 293/005* (2013.01); *C09J 133/068* (2013.01); *C09J 133/08* (2013.01); *C09J 153/00* (2013.01)

(58) Field of Classification Search
None
See application file for complete search history.

(56) References Cited

U.S. PATENT DOCUMENTS

| | | | |
|---|---|---|---|
| 4,912,169 A | 3/1990 | Whitmire et al. | |
| 5,602,221 A | 2/1997 | Bennett et al. | |
| 6,180,691 B1* | 1/2001 | Cheng | C08F 220/18 523/160 |
| 6,465,591 B1 | 10/2002 | Lee | |
| 6,569,949 B1 | 5/2003 | Lee et al. | |
| 6,596,899 B1 | 7/2003 | Lai | |
| 6,608,134 B1 | 8/2003 | Tobing et al. | |

(Continued)

FOREIGN PATENT DOCUMENTS

| | | |
|---|---|---|
| CN | 101528782 | 9/2009 |
| CN | 101248093 | 1/2011 |

(Continued)

OTHER PUBLICATIONS

Kenawy et al. (Journal of Polymer Science: Part A: Polymer Chemistry, vol. 40, 2384-2393, 2002).*

(Continued)

*Primary Examiner* — Vu A Nguyen

(57) ABSTRACT

Acrylic copolymers that include the controlled placement of particular functional groups within the polymer structure are provided. The copolymers contain at least two reactive segments and are manufactured via a controlled radical polymerization process. The copolymers are useful in the manufacture of adhesives and elastomers.

25 Claims, 2 Drawing Sheets

(56) References Cited

U.S. PATENT DOCUMENTS

| | | | |
|---|---|---|---|
| 6,706,836 B1 | 3/2004 | Holguin et al. | |
| 6,743,880 B2 | 6/2004 | Holguin | |
| 6,780,231 B2 | 8/2004 | Scholz et al. | |
| 6,828,339 B2 | 12/2004 | Ettema et al. | |
| 6,844,391 B1 | 1/2005 | Iyer et al. | |
| 6,953,602 B2 | 10/2005 | Carte et al. | |
| 7,019,067 B2 | 3/2006 | Holguin et al. | |
| 7,407,694 B2 | 8/2008 | Taniguchi | |
| 7,459,193 B2 | 12/2008 | Utz | |
| 8,431,652 B2 * | 4/2013 | Balk | C08F 293/005 525/288 |
| 8,895,669 B2 * | 11/2014 | Balk | C08F 2/001 525/242 |
| 9,644,063 B2 | 5/2017 | Miller et al. | |
| 2002/0086950 A1 | 7/2002 | Walter | |
| 2004/0097658 A1 | 5/2004 | Everaerts et al. | |
| 2004/0266965 A1 | 12/2004 | Holguin et al. | |
| 2005/0053790 A1 * | 3/2005 | Kato | C08F 8/18 428/421 |
| 2005/0085592 A1 | 4/2005 | Taniguchi et al. | |
| 2006/0089423 A1 | 4/2006 | Ueno et al. | |
| 2006/0173142 A1 | 8/2006 | Hildeberto et al. | |
| 2006/0263600 A1 | 11/2006 | Bartholomew et al. | |
| 2006/0286302 A1 | 12/2006 | Ma et al. | |
| 2007/0009582 A1 | 1/2007 | Madsen et al. | |
| 2007/0049696 A1 | 3/2007 | Gonzalez Montiel et al. | |
| 2007/0149709 A1 | 6/2007 | Parker | |
| 2008/0214712 A1 * | 9/2008 | Passade Boupat | C08F 8/44 524/272 |
| 2009/0130363 A1 | 5/2009 | Utz | |
| 2009/0171459 A1 | 7/2009 | Linhardt et al. | |
| 2010/0047620 A1 | 2/2010 | Decker et al. | |
| 2010/0280182 A1 | 11/2010 | Balk et al. | |
| 2011/0118372 A1 | 5/2011 | Lester | |
| 2011/0177302 A1 | 7/2011 | Satoshi | |
| 2013/0059971 A1 | 3/2013 | Miller | |
| 2013/0281574 A1 * | 10/2013 | Li | B65D 25/14 523/453 |

FOREIGN PATENT DOCUMENTS

| | | | |
|---|---|---|---|
| CN | 102037091 | 4/2011 | |
| EP | 248596 A2 * | 12/1987 | C08F 293/00 |
| EP | 404377 A1 * | 12/1990 | C08F 222/06 |
| EP | 1211270 | 6/2002 | |
| JP | 10-298248 | 11/1998 | |
| JP | 2006-506505 | 2/2006 | |
| JP | 2008-546873 | 12/2008 | |
| JP | 2009-108203 | 5/2009 | |
| KR | 10-2009-0024188 | 3/2009 | |
| KR | 10-2009-0024189 | 3/2009 | |
| KR | 10-2010-0137520 | 12/2010 | |
| RU | 2008143542 | 5/2010 | |
| RU | 2559893 | 8/2015 | |
| WO | 1998/01478 | 1/1998 | |
| WO | 1999/05099 | 2/1999 | |
| WO | 1999/31144 | 6/1999 | |
| WO | 03/055919 | 7/2003 | |
| WO | 2006/106277 | 10/2006 | |
| WO | 2007/023375 | 3/2007 | |
| WO | 2007/140225 | 12/2007 | |
| WO | 2008/012116 | 1/2008 | |
| WO | 2009/117654 | 9/2009 | |
| WO | 2011/146450 | 11/2011 | |

OTHER PUBLICATIONS

Waly et al. (Die Angewandte Makromolekulare Chemie 103, 1982, 61-76).*
Zhan et al., Macro. Chem. Phys. 2007, 208, 1773-1781.*
Yu et al., J. Polym. Sci., Part A: Polymer Chemistry, 1997, 35, 3507-3515.*
Titow, M.V., PVC Technology, Springer Science & Business Media, p. 960 and 962, Dec. 6, 2012.
Benedek, I., "Pressure-Sensitive Adhesives and Applications," CRC Press, p. 92-92, Feb. 2004.
Braunecker et al., "Controlled/Living Radical Polymerization: Features, Developments, and Perspectives," Progress in Polymer Science, vol. 33, Issue 1, p. 165 (2008).
Wang, J., Matyjaszewski, K., "Controlled/"Living" Radical Polymerization. Atom Transfer Radical Polymerization in the Presence of Transition-Metal Complexes", J. Am. Chem. Soc., 117: 5614-5615 (1995).
Cowie, J. M. G., Arrighi, V., Polymers: Chemistry and Physics of Modern Materials, CRC Press Taylor and Francis Group: Boca Raton, Fl, 2008, 3rd Ed., pp. 82-84.
Odian, G., Radical Chain Polymerization; Principles of Polymerization, Wiley-Interscience: Staten Island, New York, 2004, pp. 316-321.
Matyjaszewski, K., Xia, J., "Atom Transfer Radical Polymerization", Chem. Rev., 101 (9):2921-2990 (2001).
Mayadunne et al., "Living Radical Polymerization with Reversible Addition-Fragmentation Chain Transfer (RAFT Polymerization) Using Dithiocarbamates as Chain Transfer Agents," Macromolecules, 32 (21), p. 6977-6980,(1999).
Matyjaszewski et al., "Simple and Efficient Synthesis of Various Alkoxyamines for Stable Free Radical Polymerization," Macromolecules, 31 (17), p. 5955-5957, (1998).
Patten, T. E., Matyjaszewski, K., "Atom Transfer Radical Polymerization and the Synthesis of Polymeric Materials", Adv. Mater., 10: 901 (1998).
Chiefari et al., Living Free-Radical Polymerization by Reversible Addition-Fragmentation Chain Transfer: The RAFT Process, Macromolecules, 31 (16), p. 5559-5562, (1998).
Hu Y., Paul C.W., Block Copolymer-Based Hot-Melt Pressure-Sensitive Adhesives in: Technology of Pressure-Sensitive Adhesives and Products (Handbook of Pressure-Sensitive Adhesives and Products) Edited by Istvan Benedek and Mikhail M. Feldstein, CRC Press 2008, pp. 3-6 and pp. 3-7.
International Search Report and Written Opinion issued in corresponding IA No. PCT/US2011/036769 dated Aug. 1, 2011.
International Preliminary Report on Patentability issued in corresponding IA No. PCT/US2011/036769 dated Nov. 29, 2012.
"The Chemistry of Radical Polymerization", Graeme Moad & David H. Solomon, 2nd rev. ed., 2006, Elsevier, p. 508-514.
Handbook of Pressure Sensitive Adhesive Technology, Von Nostrand Reinhold, Co, Chap. 20, pp. 527-584 (1989).
International Preliminary Report on Patentability issued in corresponding IA No. PCT/US2012/059849 dated Apr. 24, 2014.
Jiang P et al., "Synthesis of well-defined glycidyl methacrylate based block copolymers with self-activation and self-initiation behaviors via ambient temperature atom transfer radical polymerization", Journal of Polymer Science Part A: Polymer Chemistry, 2007, vol. 45, pp. 2947-2958.
International Preliminary Report on Patentability issued in corresponding IA No. PCT/US2009/037800 dated Sep. 30, 2010.
International Search Report and Written Opinion issued in corresponding IA No. PCT/US2009/037800 dated May 28, 2009.
Graeme Moad & David H. Solomon, "The Chemistry of Radical Polymerization," 2nd rev. ed., 2006, Elsevier, p. 473-475.
Yan et al., "Dual-sensing porphyrin-containing copolymer nanosensor as full-spectrum colorimeter and ultra-sensitive thermometer," Chemical Communications, 2010, 46, 2781-2783.
Kenawy et al., "Biologically active polymers v. sythesis and antimicrobial activity of modified poly(glycidyl methacrylate-co-2-hydroxyethyl methacrylate) derivatives with quaternary ammonium and phosphonium salts," Journal of Polymer Science: Part A, Polymer Chemistry, vol. 40, 2384-2393, 2002.
Fan et al., "Synthesis of SAN-containing block copolymers using RAFT polymerization," Journal of Polymer Science, Part A, 2006, 44, 2260-2269.
Schilli et al., "A new double-responsive block copolymer synthesized via RAFT polymerization: poly(n-isopropylacrylamide)-block-poly(acrylic acid)," Macromolecules 2004, 37, 7861-7866.

(56) References Cited

OTHER PUBLICATIONS

Schmitz et al., "Synthesis and aggregation behaviour of amphiphilic block copolymers with random middle block," Colloid Polymer Science, 2009, 287:1183-1193.
International Search Report and Written Opinion issued in corresponding IA No. PCT/US2012/059849 dated Dec. 4, 2012.

* cited by examiner

CONTROLLED ARCHITECTURE POLYMERS

CROSS REFERENCES TO RELATED APPLICATIONS

The present application is a continuation of U.S. patent application Ser. No. 14/351,686 filed Apr. 14, 2014, which is a 371 of International Application No. PCT/US2012/059849. International Application No. PCT/US2012/059849 was published in English on Apr. 18, 2013, and claims the benefit of U.S. Provisional Patent Application No. 61/547,481 filed Oct. 14, 2011, all of which are incorporated herein by reference in their entireties.

BACKGROUND

The subject matter relates to acrylic polymers, and in particular, to acrylic copolymers that include controlled placement of reactive functional groups within the polymer structure. The copolymers are useful in the manufacture of adhesives and elastomers.

(Meth)acrylic (co)polymers have been studied and used industrially for more than 50 years. Due to a wide range of monomers, (meth)acrylic (co)polymers display a significant array of viscoelastic properties that lend themselves well to applications in adhesives and elastomers. When compared to other copolymers that are used for similar purposes as (meth)acrylics, several significant advantages of (meth)acrylics become apparent. For example, relative to natural rubber and styrene block copolymers (meth)acrylic copolymers have superior optical clarity, UV stability, and temperature and oxidative resistance. State of the art (meth)acrylic copolymers meet many performance characteristics by virtue of their high molecular weight and crosslinking reactions. Because of the wide array of copolymerizable monomers, (meth)acrylic polymers have tailorable polarity and the ability to undergo a variety of crosslinking reactions. Typically high performance (meth)acrylic copolymers are processed with large amounts of organic solvents.

Increasingly, there are significant economic and regulatory pressures for producers of solvent acrylic polymers to reduce the use of organic solvents in their processes. In particular, it is common for solvent acrylic polymers in adhesive applications to be coated from solutions averaging only 30-40% polymer. The solvent has to be evaporated and then either collected or incinerated, all of which are energy intensive and costly operations. Additionally, removal of solvent from thick adhesive films may produce defects in the dry adhesive film.

Control of polymer architecture is often the subject of intensive research with the goal of improving performance for ever increasingly challenging applications. Architectures that acrylic polymers are known to possess include block copolymers, telechelic polymers, and random polymers of controlled molecular weight. Even though advances in controlling architecture have occurred with many benefits, each of these particular architectural types has disadvantages. For example, block copolymers have high melt viscosities which require high processing temperatures, making it difficult to control reactivity of functional groups. The production of telechelic polymers often involves multiple steps. Telechelics involve the placement of a reactive functional group exclusively on the end terminus of a polymer and not elsewhere in the polymer backbone. Functional groups placed at the end termini of polymers serve solely to increase the linear molecular weight in a manner in which free polymer chain ends are eliminated. As a result, telechelic polymers can yield high strength materials but do not provide the viscoelastic properties critical to adhesives and some elastomer applications. Random polymers of controlled molecular weight require high amounts of crosslinking to attain network formation.

In the past 15-20 years a variety of controlled radical polymerization techniques have been developed to afford good architectural control of (meth)acrylic monomers. These techniques typically are tolerant to a wide variety of monomers and functional groups as opposed to previous techniques like anionic or group transfer polymerization. A substantial amount of fundamental research has been performed to understand these types of polymerization and a thorough review has been edited by Matyjewski. Reversible addition fragmentation chain transfer (RAFT) polymerization is one such technique that has been shown to work exceedingly well with a wide variety of (meth)acrylic monomers yielding excellent control of molecular weight and polydispersity. The RAFT mechanism for controlled polymerization is well understood and reported extensively. While some examples of controlled architecture acrylic PSAs have been reported, very little work has been done to explore the influence of reactive functional group placement.

SUMMARY

The present subject matter addresses problems associated with previously known architectured polymers by placement of crosslinkable monomers into segments of the polymer of controlled molecular weight and position. The overall molecular weight is low which yields desirable low viscosity, high solids solutions and melts. In conjunction with good processability, high performance elastomers and adhesives are obtained upon crosslinking. In particular, the crosslinkable monomers are placed in specific segments of the polymer backbone so that the crosslink density is controlled for optimal performance. The compositions of the present subject matter contain no undesired heterogeneity prior to crosslinking. A further benefit is that in all embodiments of the subject matter, the polymer chain ends are preserved to yield desired visco-elastic and surface properties. To control the placement of crosslinkable monomers, it is preferred to employ a controlled free radical polymerization technique. In contrast with standard free radical processes it is now possible to control the placement of crosslinkable monomers.

In one aspect, the present subject matter provides an acrylic polymer comprising a first reactive segment that includes at least one monomer having a self reactive functional group. The acrylic polymer also comprises a second reactive segment that includes at least one monomer having a reactive functional group.

In another aspect, the present subject matter provides a crosslinkable composition comprising an acrylic polymer including a first reactive segment that includes at least one monomer having a self reactive functional group, and a second reactive segment that includes at least one monomer having a reactive functional group.

In yet another aspect, the present subject matter provides a method of preparing a crosslinkable composition comprising polymerizing at least one monomer having a self reactive functional group to thereby form a first reactive segment. The method also comprises polymerizing at least one monomer having a reactive functional group to thereby form a second reactive segment. At least one of the first reactive segment and the second reactive segment includes an acrylate group. The method also comprises forming an acrylic polymer from the first reactive segment and the second reactive segment.

DETAILED DESCRIPTION

Figure 1:
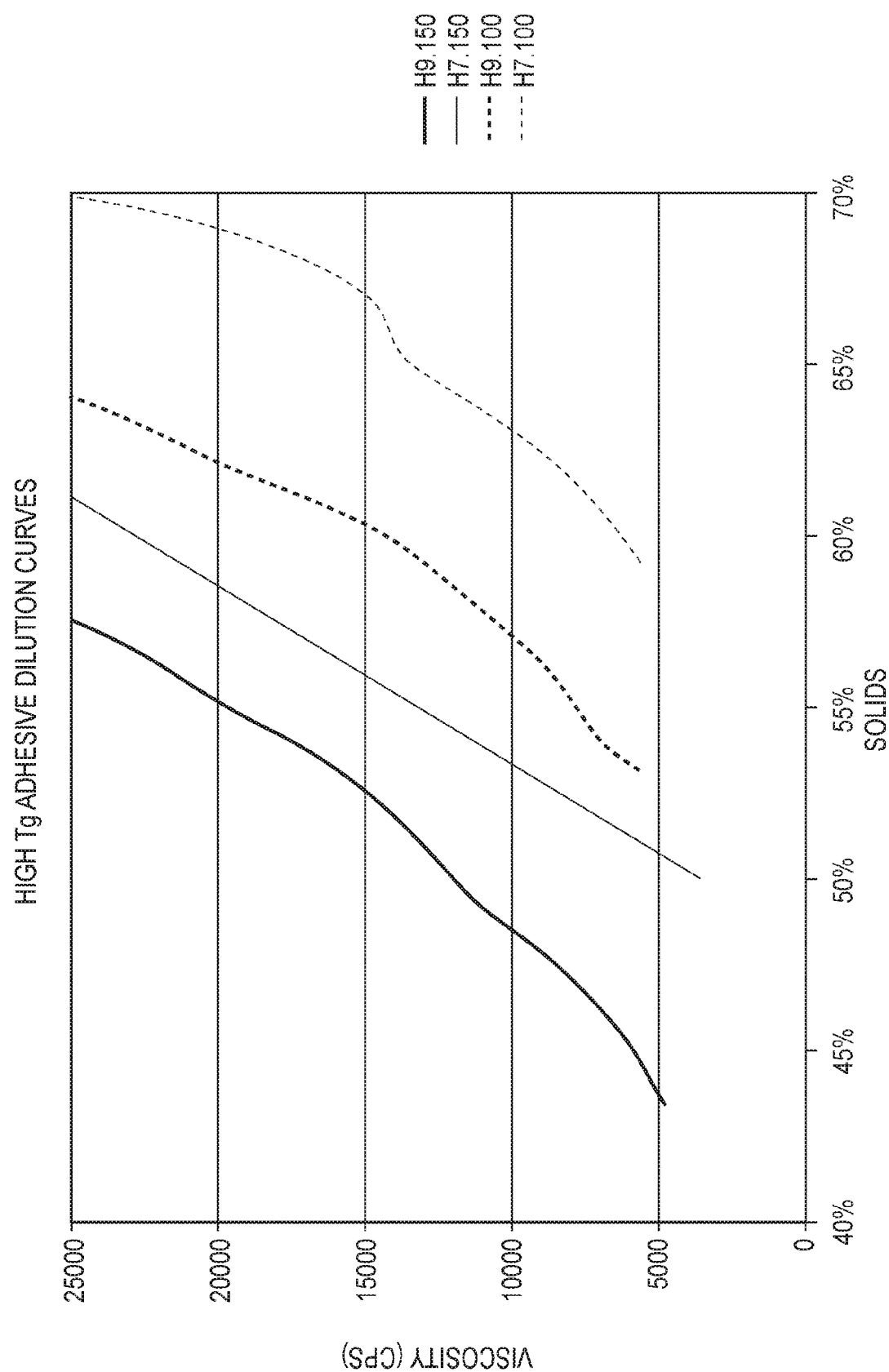
FIG. 1 is a graph of viscosity as a function of solids content for high glass transition temperature polymeric samples described herein.

Acrylic copolymers prepared by sequential polymerization of polymer segments from various monomers are provided. The preferred embodiment copolymers contain a first reactive segment preferably at a polymer chain end and at least one other or a second reactive segment preferably at another polymer chain end. The first reactive segment includes at least one functional group that is capable of undergoing a crosslinking reaction. Preferably, the second reactive segment also includes at least one functional group that is capable of undergoing a crosslinking reaction. The reactive segments have controlled size and placement for tailored properties. For example, by selectively placing functional groups in desirable positions on a polymer molecule, polymers that yield pressure sensitive adhesives that exhibit enhanced balance between cohesion and adhesion can be produced. In certain embodiments the polymers also include a third segment which is located between the first reactive segment and the second reactive segment. The third segment preferably includes at least one reactive functionality and/or a nonreactive segment. Also provided are adhesive compositions based upon the various polymers, and methods of preparing the polymers.

High modulus elastomers and high strength adhesives typically display a constant modulus as a function of temperature. Conversely, highly extensible, tough elastomers, and high tack and peel adhesives often have a degree of viscous liquid character. One route to this behavior is through control of crosslink density via placement of reactive functionalities in specific segments of the polymer. Placing reactive functionalities in segments adjacent to the polymer end groups yields high modulus and high strength. Placing the reactive functionalities in the central segment(s) of the polymer yields significant viscous liquid character. As described herein, the present subject matter provides strategies for controlling the structure and architecture of polymers and thereby enabling production of compositions having specific and desired characteristics.

Polymers and Crosslinkable Compositions

Generally, the present subject matter provides an acrylic polymer having a first reactive segment that includes at least one monomer having a self reactive functional group, and a second reactive segment that includes at least one monomer having a reactive functional group. The reactive functionalities in the first reactive segment and the second reactive segment may be the same or different from one another. A wide array of reactive functionalities can be included in the first and second reactive segments. In certain embodiments, the reactive functional group of the second reactive segment is a self reactive functional group as in the first reactive segment. The self reactive functional group in the second reactive segment may be the same or different than the self reactive functional group of the first reactive segment. And, in certain embodiments, the second reactive segment is free of a self reactive functional group.

The term "reactive functional group" refers to a functional group that is capable of reacting with another functional group. The term "self reactive functional group" refers to a functional group that is capable of reacting with (i) an identical second self reactive functional group, (ii) with a different second self reactive functional group and/or (iii) with a reactive functional group. That is, the self reactive functional group can react with another identical self reactive functional group, with another self reactive functional group that is different, and/or with a reactive functional group. Self reactive functional groups are capable of polymerizing with themselves. Preferably, the self reactive functional group is selected from anhydrides, epoxies, alkoxymethylols, and cyclic ethers. Non-limiting examples of reactive functional groups are provided herein, however preferably include acids, hydroxyls, amines, and mercapto (thiols).

In another embodiment of the subject matter, there is provided a crosslinkable composition comprising at least one acrylic copolymer having a first reactive segment of controlled size and position and at least one other or second reactive segment of controlled size and position. The first reactive segment comprises at least one monomer having a self reactive functional group as described herein. The other or second reactive segment comprises at least one monomer having a reactive functional group and is preferably reactive with the self reactive functional group of the first reactive segment. The second reactive segment may contain a group that is capable of undergoing crosslinking while remaining reactive with the reactive segment. The acrylic copolymer of the crosslinkable composition may in certain embodiments also preferably comprise a third polymeric segment. The third polymeric segment preferably includes a reactive functionality and/or a nonreactive segment. Additional aspects as described in conjunction with the previously described preferred embodiment acrylic copolymers are included in the examples described herein.

In certain embodiments, the acrylic copolymers preferably include at least one nonreactive segment. The nonreactive segments of the acrylic polymer may be derived from acrylates, methacrylates, or mixtures thereof. The acrylates include $C_1$ to about $C_{20}$ alkyl, aryl or cyclic acrylates such as methyl acrylate, ethyl acrylate, phenyl acrylate, butyl acrylate, 2-ethylhexyl acrylate, n-hexyl acrylate, n-heptyl acrylate, n-octyl acrylate, n-nonyl acrylate, isobornyl acrylate, 2-propyl heptyl acrylate, isodecyl acrylate, isostearyl acrylate and the like. These moieties typically contain from about 3 to about 20 carbon atoms, and in one embodiment about 3 to about 8 carbon atoms. The methacrylates include $C_1$ to about $C_{20}$ alkyl, aryl or cyclic methacrylates such as methyl methacrylate, ethyl methacrylate, butyl methacrylate, 2-ethylhexyl methacrylate, phenyl methacrylate, isobornyl methacrylate, isooctyl methacrylate, and the like. These moieties typically contain from about 4 to about 20 carbon atoms, and in one embodiment about 3 to about 10 carbon atoms.

The preferred embodiment polymers exhibit relatively narrow ranges of molecular weight and thus have relatively low polydispersity values. Typically, the preferred embodiment polymers exhibit polydispersity (Pdi) values of less than 4.0, preferably less than 3.5, more preferably less than 3.0, more preferably less than 2.5, and most preferably less than 2.0. In certain embodiments, the preferred embodiment polymers exhibit polydispersities of less than 1.5, and as low as about 1.4. The preferred embodiment polymers typically have a number average molecular weight (Mn) of from about 40,000 to about 150,000, and preferably about 50,000 to about 110,000. However, it will be appreciated that the subject matter includes polymers having molecular weights and/or polydispersity values greater than or less than the values noted herein.

Reactive Segments

The reactive segments of the acrylic polymer may be a copolymer derived from one or more of the monomers of a nonreactive segment and at least one polymerizable comonomer having crosslinkable functionality. In one embodiment, the reactive segment comprises at least one monomer having the formula (I):

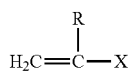
(I)

where R is H or $CH_3$ and X represents or contains a functional group capable of crosslinking. The crosslinkable functional group of the reactive segment of the acrylic polymer is not particularly restricted, but may include one or more crosslinkable silyl, hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, and cyclic ether groups. As previously noted, the functional group of at least one reactive segment is a self reactive functional group and most preferably is selected from the previously noted collection of self reactive functional groups.

Hydroxy functional monomers include, for example, hydroxy ethyl (meth)acrylate, hydroxy isopropyl (meth)acylate, hydroxy butyl (meth)acrylate and the like.

Epoxy functional monomers include, for example, glycidyl methacrylate and glycidal acrylate. In certain embodiments, a particularly preferred epoxy functional monomer is commercially available under the designation S-100 from Synasia. That monomer is 3, 4 epoxycydohexylmethyl methacrylate, [CAS 82428-30-6], having a chemical formula $C_{11}H_{16}O_3$ and a molecular weight of 196.2.

The acid containing monomers include, for example, unsaturated carboxylic acids containing from 3 to about 20 carbon atoms. The unsaturated carboxylic acids include, among others, acrylic acid, methacrylic acid, itaconic acid, beta carboxy ethyl acrylate, mono-2-acroyloxypropyl succinate, and the like. It is contemplated that phosphoric acids may be used.

Anhydride containing monomers include, for example, maleic anhydride, itaconic anhydride, citraconic anhydride and the like.

The acrylamides include, for example, acrylamide and its derivatives including the N-substituted alkyl and aryl derivatives thereof. These include N-methyl acrylamide, N,N-dimethyl acrylamide, t-octyl acrylamide and the like. The methacrylamides include methacrylamide and its derivatives including the N-substituted alkyl and aryl derivatives thereof.

Vinyl groups include, for example, vinyl esters, vinyl ethers, vinyl amides, and vinyl ketones. The vinyl esters include vinyl acetate, vinyl propionate, vinyl butyrate, vinyl valerate, vinyl versitate, vinyl isobutyrate and the like. The vinyl ethers include vinyl ethers having 1 to about 8 carbon atoms including ethylvinyl ether, butylvinyl ether, 2-ethylhexylvinyl ether and the like. The vinyl amides include vinyl amides having 1 to about 8 carbon atoms including vinyl pyrrolidone, and the like. The vinyl ketones include vinyl ketones having 1 to about 8 carbon atoms including ethylvinyl ketone, butylvinyl ketone, and the like.

Silyl groups include, for example, polymerizable silanes. The polymerizable silanes include vinyltrimethoxysilane, vinyltriethoxysilane, vinyltripropoxysilane, vinylmethyldimethoxysilane, vinylmethyldiethoxy-silane, vinylmethyldipropoxysilane, γ-methacryloxypropyl-trimethoxysilane, γ-methacryloxypropyltriethoxysilane, γ-methacryloxypropyl-tripropoxysilane, γ-methacryloxydimethoxysilane, γ-methacryloxypropyl-methyldimethoxysilane, γ-methacryloxypropylmethyldiethoxysilane, γ-methacryl-oxypropylmethyldipropoxysilane, γ-methacryloxymethyl-dimethoxysilane, γ-methacryloxymethyltrimethoxysilane, γ-methacryloxymethyl-triethoxy-silane, (methacryloxymethyl) methyldimethoxysilane, (methacryloxymethyl)-methyldiethoxysilane, γ-methacryloxypropyltriacetoxysilane, γ-acryloxypropyltrimethoxy-silane, γ-acryloxypropyltriethoxy-silane, γ-methacryl-oxymethyldiethoxysilane, γ-acryloxypropyltripropoxy-silane, γ-acryloxypropyl-methyldimethoxysilane, γ-acryloxypropylmethyldiethoxysilane, γ-acryloxypropyl-ethyldipropoxysilane, and the like.

In addition to the monomer having functional group(s), the reactive segment may include at least one monomer having the formula (II):

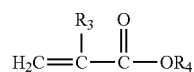
(II)

where $R_3$ is H or $CH_3$ and $R_4$ is a branched or unbranched, saturated alkyl group having 4 to 14 carbon atoms.

Methods

The present subject matter also provides, in another embodiment, a multiple step polymerization process for making a crosslinkable acrylic copolymer having a first reactive segment with one or more self reactive functional groups provided by at least one monomer. Preferably, the monomer is an acrylic monomer. A second reactive segment is added to the first segment to form the acrylic copolymer. The second reactive segment preferably contains one or more crosslinkable functional groups and is miscible with the first segment. As used herein, the term "molecularly miscible" means a compound or mixture of compounds that exhibit properties in the bulk state that are indicative of single phase behavior. With respect to the acrylic copolymer, the observation of a single Tg is indicative of polymer segment miscibility. The single Tg is intermediate between those of the constituent polymer segments and varies monotonically between these values as the relative amounts of each segment changes.

In an alternative embodiment, there is provided a process for making a crosslinkable acrylic copolymer having a first segment including self reactive functional groups, and a second segment having reactive functional groups provided by at least one monomer, which is preferably an acrylic monomer. The second segment is reacted with the first segment to form the acrylic copolymer.

With conventional free-radical polymerization, polymers are terminated when the reactive free radical end group is destroyed via termination or chain transfer reactions. The termination and chain transfer processes are typically irreversible and yield a polymer that is inactive. The result of this is a broad molecular weight distribution and little control over the distribution of monomers in the polymer backbone. Controlled radical polymerizations involve reversible radical processes in which irreversible termination and chain transfer are largely absent. There are three main types of controlled radical polymerization methodologies including atom transfer radical polymerization (ATRP), reversible addition-fragmentation chain transfer (RAFT), and stable free radical polymerization (SFRP) (of which nitroxide mediated polymerization (NMP) is a subset). RAFT and SFRP are particularly useful methods because of their tolerance to a wide array of functional groups and their efficiency and versatility in producing controlled radical polymerized polymers.

The acrylic copolymers of the subject matter are prepared using any of the controlled radical polymerization processes, which include atom-transfer radical polymerization (ATRP); rapid addition-fragmentation chain transfer (RAFT); and stable free radical polymerization (SFRP). Nitroxide-mediated polymerization (NMP) is an example of an SFRP process.

ATRP involves the chain initiation of free radical polymerization by a halogenated organic species in the presence of a metal halide species. The metal has a number of different oxidation states that allows it to abstract a halide from the organohalide, creating a radical that then starts free radical polymerization. After initiation and propagation, the radical on the chain active chain terminus is reversibly terminated (with the halide) by reacting with the catalyst in its higher oxidation state. A simplified mechanism for reversible activation-deactivation of polymer chains during ATRP is shown in Scheme 1. Thus the redox process gives rise to an equilibrium between dormant (polymer-halide) and active (polymer-radical) chains. The equilibrium is designed to heavily favor the dormant state, which effectively reduces the radical concentration to sufficiently low levels to limit bimolecular coupling.

The initiator in ATRP is usually a low molecular weight activated organic halide (RX, R=activated alkyl, X=chlorine, bromine, iodine). However, organic pseudohalides (e.g., X=thiocyanate, azide) and compounds with weak N—X (e.g., N-bromosuccinimide) or S—X (e.g., sulfonyl halides) may be used. ATRP can be mediated by a variety of metals, including Ti, Mo, Re, Fe, Ru, Os, Rh, Co, Ni, Pd and Cu. Complexes of Cu offer the most efficient catalysts in the ATRP of a broad range of monomer in diverse media. Commonly used nitrogen-based ligands used in conjunction with Cu ATRP catalysts include derivatives of bidentate bipyridine and pyridine imine, tridentate diethylenetriamine and tetradentate tris[2-aminoethylene]amine and tetraazacyclotetradecane.

Scheme 1

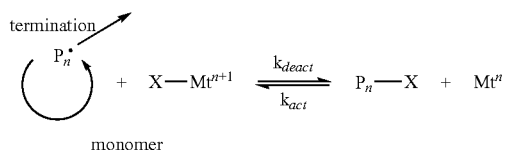

Controlled polymerization by RAFT occurs via rapid chain transfer between growing polymer radicals and dormant polymer chains. After initiation, the control agent becomes part of the dormant polymer chain. The key mechanistic features of RAFT are illustrated in Scheme 2. Common RAFT agents contain thiocarbonyl-thio groups, and include, for example, dithioesters, dithiocarbamates, trithiocarbonates and xanthenes. Examples of useful RAFT agents include those described in "The Chemistry of Radical Polymerization", Graeme Moad & David H. Solomon, $2^{nd}$ rev. ed., 2006, Elsevier, p. 508-514, which is incorporated by reference herein.

Initiation and radical-radical termination occur as in conventional radical polymerization. In the early stages of the polymerization, addition of a propagating radical (Pn•) to the thiocarbonylthio compound followed by fragmentation of the intermediate radical gives rise to a polymeric thiocarbonylthio compound and a new radical (R•). Reaction of the radical (R•) with monomer forms a new propagating radical (Pm•). A rapid equilibrium between the active propagating radicals (Pn• and Pm•) and the dormant polymeric thiocarbonylthio compounds provides equal probability for all chains to grow and allows for the production of narrow dispersity polymers.

Scheme 2

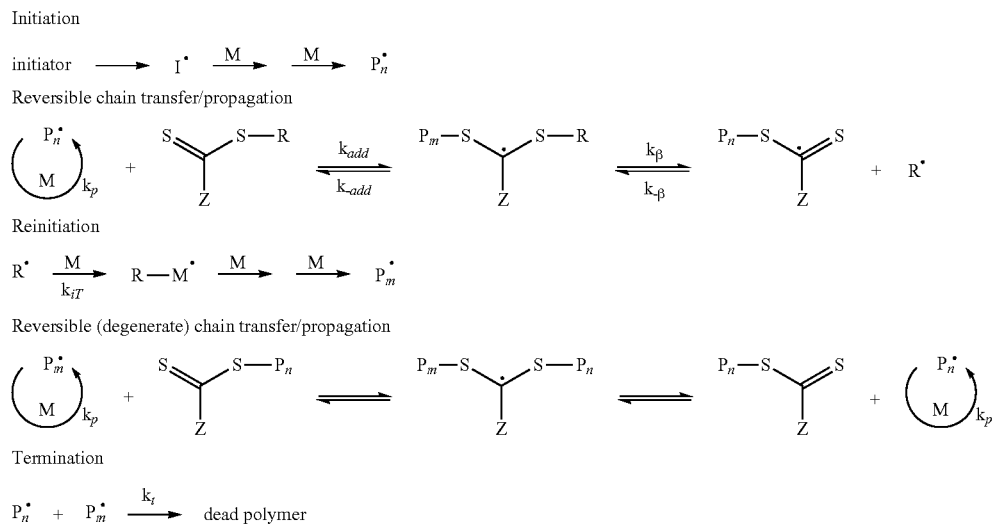

SFRP, and in particular, NMP achieves control with dynamic equilibrium between dormant alkoxyamines and actively propagating radicals. The use of nitroxides to mediate (i.e., control) free radical polymerization has been developed extensively. Many different types of nitroxides have been described and there are many methods for producing nitroxides in-situ. Regardless of the nitroxide or its method of generation, the key mechanistic feature of NMP is reversible coupling of the nitroxide (i.e., R2NO) to a growing polymer chain radical (P•) as shown in Scheme 3.

Scheme 3

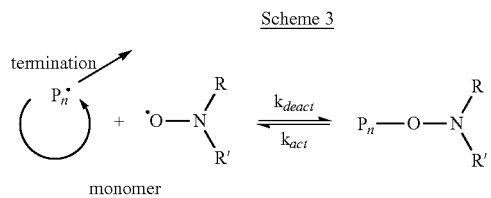

Examples of useful NMP agents include those described in "The Chemistry of Radical Polymerization", Graeme Moad & David H. Solomon, $2^{nd}$ rev. ed., 2006, Elsevier, p. 473-475, which is incorporated by reference herein. An example of a commercially available NMP agent is BlocBuilder®, an alkoxyamine compound that acts an initiator and control agent, available from Arkema.

The methods for forming the preferred embodiment acrylic polymers preferably use one or more polymerization catalysts. The polymerization catalyst can be, for example, organic tin compounds, metal complexes, amine compounds and other basic compounds, organic phosphate compounds, and organic acids. Examples of the organic tin compounds include dibutyltin dilaurate, dibutyltin maleate, dibutyltin phthalate, stannous octoate, dibutyltin methoxide, dibutyltin diacetylacetate and dibutyltin diversatate. Examples of metal complexes are titanate compounds such as tetrabutyl titanate, tetraisopropyl titanate, and tetraethanolamine titanate; metal salts of carboxylic acids, such as lead octoate, lead naphthoate, and cobalt naphthoate; and metal acetylacetonate complexes such as aluminum acetylacetonate complex and vanadium acetylacetonate complex. The amine compounds and other basic compounds include, for example aminisilanes such as γ-aminopropyl trimethoxysilane and γ-aminopropyltriethoxysilane; quaternary ammonium salts such as tetramethylammonium chloride and benzalkonium chloride; and straight-chain or cyclic tertiary amines or quaternary ammonium salts each containing plural nitrogen atoms. The organic phosphate compounds include monomethyl phosphate, di-n-butyl phosphate and triphenyl phosphate. Examples of organic acid catalysts include alkyl sulfonic acids such as methane sulfonic acid, aryl sulfonic acids such as p-toluene sulfonic acid, benzene sulfonic acid, styrene sulfonic acid and the like.

Adhesives

Adhesives having a wide array of properties can be formed from the acrylic polymers and/or compositions described herein. Generally, the acrylic polymers described herein are crosslinked and combined with one or more components to provide an adhesive composition. The preferred embodiment adhesives are preferably pressure sensitive adhesives. The polymer may be crosslinked during post curing of the adhesive to increase the cohesive strength of the pressure sensitive adhesive. This can be achieved via covalent crosslinking such as heat, actinic or electron beam radiation, or metal based ionic crosslinking between functional groups. Table 1 below lists representative examples of crosslinkers for various functional groups of the segmented polymer.

TABLE 1

Crosslinkers

| Functional Group of Segmented Polymer | Crosslinker |
| --- | --- |
| Silane (Silyl) | Self-reactive |
| Hydroxyl | Isocyanate, Melamine Formaldehyde, Anhydride, Epoxy, Titanium esters and Chelates |
| Carboxylic acid, phosphoric acid | Aziridines, Isocyanate, Melamine Formaldehyde, Anhydride, Epoxy, Carbodiimides, Metal Chelates, Titanium esters and Oxazolines |
| Isocyanate | Self-reactive, Carboxylic acid, Amine, Hydroxyl |
| Vinyl | Addition reaction with Silicone hydride |
| (Meth)acrylate | Amine, Mercaptan, Self-reactive with radical catalyst (UV, Thermal), Acetoacetate |
| Epoxy | Amine, Carboxylic acid, Phosphoric acid, Hydroxyl, Mercaptan |
| Amine | Isocyanate, Melamine formaldehyde, anhydride, epoxy, acetoacetate |
| Mercapto (thiol) | Isocyanate, Melamine formaldehyde, Anhydride, Epoxy |
| Acetoacetate | Acrylate, Amine |
| Alkoxymethylol | Acid, Hydroxyl, Thiol (Mercapto), Amine |
| Cylic Ethers | Hydroxyl, Amines, Thiol (Mercapto) |

Suitable polyfunctional aziridines include, for example, trimethylolpropane tris[3-aziridinylpropionate]; trimethylolpropane tris[3-(2-methylaziridinyl) propionate]; trimethylolpropane tris[2-aziridinylbutyrate]; tris(1-aziridinyl)-phosphine oxide; tris(2-methyl-1-aziridinyl)phosphine oxide; penta-erythritoltris[3-(1-aziridinyl)propionate]; and pentaerythritol tetrakis[3-(1-aziridinyl)propionate]. Combinations of more than one polyfunctional aziridine may also be used. Examples of commercially available polyfunctional aziridines include NEOCRYL CX-100 from Zeneca Resins, believed to be trimethylolpropaten tris[3-(2-methylaziridinyl)-propanoate], and Xama-2, Xama-7 and Xama-220 from Bayer Material Science.

Multifunctional aziridine amides which have the general formula (III):

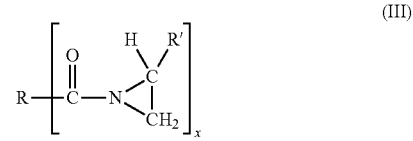

(III)

wherein R can be either an alkylene or aromatic group and R' can be a hydrogen or alkyl group and x is at least 2 may be used. Examples of suitable multifunctional aziridine amides include 1,1'-(1,3-phenylenedicarbonyl)bis[2-methyl aziridine]; 2,2,4-trimethyladipoyl bis [2-ethyl aziridine]; 1,1'-azelaoyl bis [2-methyl aziridine]; and 2,4,6-tris(2-ethyl-1-aziridinyl)-1,3,5 triazine.

Metal chelate crosslinking agents may be compounds prepared by coordinating multivalent metals such as Al, Fe, Zn, Sn, Ti, Sb, Mg and V with acethylacetone or ethyl acetoacetate.

Among the isocyanate crosslinking agents that can be used are aromatic, aliphatic and cycloaliphatic diisocyanates and triisocyanates. Examples include 2,4-toluene diisocyanate, m-phenylene diisocyanate, 4-chloro-1,3-phenylene diisocyanate, 3,3'-dimethyl-4,4'-diphenylene diisocyanate, 4,4'-diphenylene diisocyanate, xylene diisocyanate, 1,6-hexamethylene diisocyanate, 1,10-decamethylene diisocyanate, 1,4-cyclohexylene diisocyanate, 4,4'methylene bis(cyclohexyl isocyanate), 1,5-tetrahydronaphthalene diisocyanate, paraxylylene diisocyanate, durene diisocyanate, 1,2,4-benzene diisocyanate, isoform diisocyanate, 1,4-tetramethylxylene diisocyanate, 1,5-naphthalene diisocyanate, or their reactants with polyol such as trimethylolpropane.

Other useful crosslinking agents include monomeric and polymeric melamine crosslinkers, such as Cymel 303 and 370 available from Cytec.

The crosslinking agent is typically used at a level from about 0.05% to about 5%, or from about 0.075% to about 2%, or from about 0.1% to about 1.5% by weight of adhesive solids.

Anhydride functional segmented polymers may be converted to silanes via a post polymerization reaction with amino-, mercapto- or hydroxyl-functional silanes. Examples of amino group-containing alkoxysilanes having a primary amino group alone as a reactive group include aminoalkyltrialkoxysilanes such as aminomethyltrimethoxysilane, aminomethyltriethoxysilane, β-amino-ethyltrimethoxysilane, β-aminoethyltriethoxysilane, γ-aminopropyltrimethoxysilane, γ-aminopropyltriethoxysilane, γ-aminopropyltripropoxysilane, γ-aminopropyltriisopropoxysilane, and γ-aminopropyltributoxysilane; (aminoalkyl)-alkyldialkoxysilanes such as β-aminoethylmethyldimethoxysilane, γ-amino-ethylmethyldiethoxysilane, γ-aminopropylmethyldimethoxysilane, γ-aminopropyl-methyldiethoxysilane, and γ-aminopropylmethyldipropoxysilane; and corresponding aminoalkyldialkyl(mono)alkoxysilanes.

Examples of amino group-containing alkoxysilanes having a primary amino group and a secondary amino group as reactive groups include N-(aminoalkyl)aminoalkyltrialkoxysilanes such as N-β-(aminoethyl)-γ-aminopropyl-trimethoxysilane and N-β-(aminoethyl)-γ-aminopropyltriethoxysilane; and N-(aminoalkyl) aminoalkylalkyldialkoxysilanes such as N-β-(aminoethyl)-γ-amino-propylmethyldimethoxysilane and N-β-(aminoethyl)-γ-aminopropylmethyl-diethoxysilane.

Examples of amino group-containing alkoxysilanes having a secondary amino group alone as a reactive group include N-phenylamino-methyltrimethoxysilane and N-phenyl-β-aminoethyltrialkoxysilanes such as N-phenyl-β-aminoethyltrimethoxysilane and N-phenyl-β-aminoethyltriethoxysilane; N-phenyl-γ-aminopropyltrialkoxysilanes such as N-phenyl-γ-aminopropyltrimethoxysilane, N-phenyl-γ-aminopropyltriethoxysilane, N-phenyl-γ-aminopropyltripropoxysilane, and N-phenyl-γ-aminopropyltributoxysilane; corresponding N-phenylaminoalkyl(mono- or di-)alkyl (di- or mono-)alkoxysilanes; as well as N-alkylaminoalkyltrialkoxysilanes corresponding to the above-listed amino group-containing alkoxysilanes having a secondary amino group substituted with phenyl group, such as N-methyl-3-aminopropyltrimethoxysilane, N-ethyl-3-aminopropyltrimethoxysilane, N-n-propyl-3-aminopropyltrimethoxysilane, N-n-butyl-aminomethyltrimethoxysilane, N-n-butyl-2-aminoethyltrimethoxysilane, N-n-butyl-3-aminopropyltrimethoxysilane, N-n-butyl-3-aminopropyltriethoxysilane, and N-n-butyl-3-aminopropyltripropoxysilane, and corresponding N-alkylaminoalkyl(mono- or di-) alkyl(di- or mono)alkoxysilanes. Others include N-cyclohexylaminomethylmethyldiethoxy silane and N-cyclohexylaminomethyl-triethoxysilane.

Examples of the mercapto group-containing silanes include mercaptoalkyltrialkoxysilanes such as mercaptomethyltrimethoxysilane, mercaptomethyltriethoxysilane, β-mercaptoethyltrimethoxysilane, β-mercapto-ethyltriethoxysilane, β-mercaptoethyltripropoxysilane, β-mercaptoethyl-triisopropoxysilane, β-mercaptoethyltributoxysilane, γ-mercaptopropyl-trimethoxysilane, γ-mercaptopropyltriethoxysilane, γ-mercaptopropyltripropoxysilane, γ-mercaptopropyltriisopropoxysilane, and γ-mercapto-propyltributoxysilane; (mercaptoalkyl)alkyldialkoxysilanes such as β-mercaptoethylmethyldimethoxysilane, β-mercaptoethylmethyldiethoxysilane, γ-mercaptopropylmethyldimethoxysilane, γ-mercaptopropylmethyldiethoxysilane, γ-mercaptopropylmethyldipropoxysilane, β-mercaptopropylmethyldiisopropoxy-silane, γ-mercaptopropylmethyldibutoxysilane, β-mercaptopropylmethyldibutoxysilane, γ-mercaptopropyl-ethyldimethoxy-silane, γ-mercaptopropylethyldiethoxysilane, γ-mercaptopropylethyldipropoxy-silane, γ-mercaptopropylethyldiisopropoxysilane, and γ-mercaptopropylethyldibutoxysilane; and corresponding (mercaptoalkyl) dialkyl(mono)-alkoxysilanes.

Examples of hydroxyl-functional silanes include hydroxymethyltrialkoxy silanes having the formula (IV):

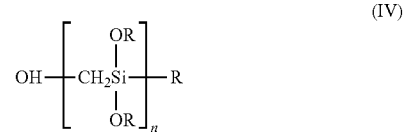

(IV)

Where R is an alkyl group and n is at least 1. The alkyl group is preferably a lower alkyl group having 1 to 6 carbon atoms, and preferably 1 to 3 carbon atoms. Particularly useful are the silanes in which the alkyl group is methyl or ethyl, namely hydroxymethyltriethoxysilane and hydroxymethyltriethoxysilane when n is equal to 1.

The adhesives of the present subject matter may further comprise additives such as pigments, fillers, plasticizer, diluents, antioxidants, tackifiers and the like. Pigment, if desired, is provided in an amount sufficient to impart the desired color to the adhesive. Examples of pigments include, without limitation, solid inorganic fillers such as carbon black, titanium dioxide and the like, and organic dyes. Additional inorganic fillers such as aluminum trihydrate, christobalite, glass fibers, kaolin, precipitated or fumed silica, copper, quartz, wollasonite, mica, magnesium hydroxide, silicates (e.g. feldspar), talc, nickel and calcium carbonate are also useful. Metal oxides such as aluminum trihydrate and magnesium hydroxide are particularly useful as flame retardants.

A wide variety of tackifiers can be used to enhance the tack and peel of the adhesive. These include rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

There may also be employed terpene resins which are hydrocarbons of the formula $C_{10}H_{16}$, occurring in most essential oils and oleoresins of plants, and phenol modified terpene resins like alpha pinene, beta pinene, dipentene, limonene, myrecene, bornylene, camphene, and the like. Various aliphatic hydrocarbon resins like Escorez 1304, manufactured by Exxon Chemical Co., and aromatic hydrocarbon resins based on $C_9$, $C_5$, dicyclopentadiene, coumarone, indene, styrene, substituted styrenes and styrene derivatives and the like can also be used.

Hydrogenated and partially hydrogenated resins such as Regalrez 1018, Regalrez 1033, Regalrez 1078, Regalrez 1094, Regalrez 1126, Regalrez 3102, Regalrez 6108, etc., produced by Eastman Chemical Company, can be used. Various terpene phenolic resins of the type SP 560 and SP 553, manufactured and sold by Schenectady Chemical Inc., Nirez 1100, manufactured and sold by Reichold Chemical Inc., and Piccolyte S-100, manufactured and sold by Hercules Corporation, are particularly useful tackifiers for the present subject matter. Various mixed aliphatic and aromatic resins, such as Hercotex AD 1100, manufactured and sold by Hercules Corporation, can be used.

While the resins described above are quite useful for tackifying the copolymers of the instant subject matter, the particular tackifying resin and/or amount selected for a given formulation may depend upon the type of acrylic polymer being tackified. Many resins which are known in the prior art as being useful for tackifying acrylic based pressure sensitive adhesives can be effectively used in the practice of the present subject matter, although the scope of the subject matter is not limited to only such resins. Resins described in Satas, Handbook of Pressure Sensitive Adhesive Technology, Von Nostrand Reinhold, Co, Chap. 20, pages 527-584 (1989) (incorporated by reference herein) could be used.

The amount of tackifier used in the present subject matter is dependent upon the type of copolymer and tackifier used. Typically, pressure sensitive adhesive compositions prepared in accordance with the present subject matter will comprise from 5 to about 60% by weight total of one or more tackifiers.

In one embodiment, the tackifier has a ring and ball softening point of from about 100° C. to about 150° C. In one embodiment, the tackifier comprises a terpene phenolic tackifier having a ring and ball softening point of from about 110° C. to about 120° C.

In another embodiment, the added resin may serve a dual purpose. For example, a resin such as Wingstay L®, a butylated reaction product of para-cresol and dicyclopentadiene with an average molecular weight of 650 produced by Eliokem, can serve both as a tackifier and an antioxidant.

In one embodiment, a low molecular weight polymeric additive is incorporated into the adhesive composition. The polymeric additive is polymerized from monomers selected from $C_1$-$C_{20}$ alkyl and cycloalkyl acrylates, $C_1$-$C_{20}$ alkyl and cycloalkyl methacrylates, free radical polymerizable olefinic acids, and optionally other ethylenically unsaturated monomers. Suitable alkyl and cycloalkyl acrylates include the various esters of acrylic acid such as methyl acrylate, ethyl acrylate, n-propyl acrylate, isopropyl acrylate, n-butyl acrylate, isobutyl acrylate, t-butyl acrylate, isobornyl acrylate, pentyl acrylate, hexyl acrylate, octyl acrylate, iso-octyl acrylate, nonyl acrylate, lauryl acrylate, stearyl acrylate, eicosyl acrylate, 2-ethylhexyl acrylate, cyclohexyl acrylate, cycloheptyl acrylate, and the like and mixtures thereof. Suitable alkyl and cycloalkyl methacrylate include the esters of methacrylic acid such as methyl methacrylate, ethyl methacrylate, propyl methacrylate, n-butyl methacrylate, t-butyl methacrylate, isobutyl methacrylate, pentyl methacrylate, hexyl methacrylate, cyclohexyl methacrylate, 2-ethylhexyl methacrylate, isobornyl methacrylate, heptyl methacrylate, cycloheptyl methacrylate, octyl methacrylate, iso-octyl methacrylate, nonyl methacrylate, decyl methacrylate, lauryl methacrylate, eicosyl methacrylate and the like and mixtures thereof. Suitable free-radical polymerizable olefinic acids include acrylic acid, methacrylic acid, fumaric acid, crotonic acid, itaconic acid, 2-acryloxypropionic acid, and the like and mixtures thereof.

Various amounts of other ethylenically-unsaturated monomers can optionally be used provided that the polymeric additive has a softening point greater than about 40° C. and a number average molecular weight less than about 35,000. Optional ethylenically-unsaturated monomers suitable for use in the polymeric additive include, for example, styrene, alpha-methyl styrene, vinyl toluene, acrylonitrile, methacrylonitrile, ethylene, vinyl acetate, vinyl chloride, vinylidene chloride, acrylamide, methacrylamide 2-cyanoethyl acrylate, 2-cyanoethyl methacrylate, dimethylaminoethyl methacrylate, dimethylaminopropyl methacrylate t-butylaminoethyl methacrylate, glycidyl acrylate, glycidyl methacrylate, benzyl acrylate, benzyl methacrylate, phenyl acrylate, phenyl methacrylate and the like. The amount of the polymeric additive used may be in the range of about 1% to about 55% by weight, based on the total weight of the adhesive composition. Such low molecular weight additives as described in U.S. Pat. No. 4,912,169, the disclosure of which is hereby incorporated by reference.

Certain preferred embodiment adhesives have a relatively high solids content. Typically, the weight percentage of solids is greater than 50%, more preferably at least 60%, and more preferably at least 70%.

Figure 2:
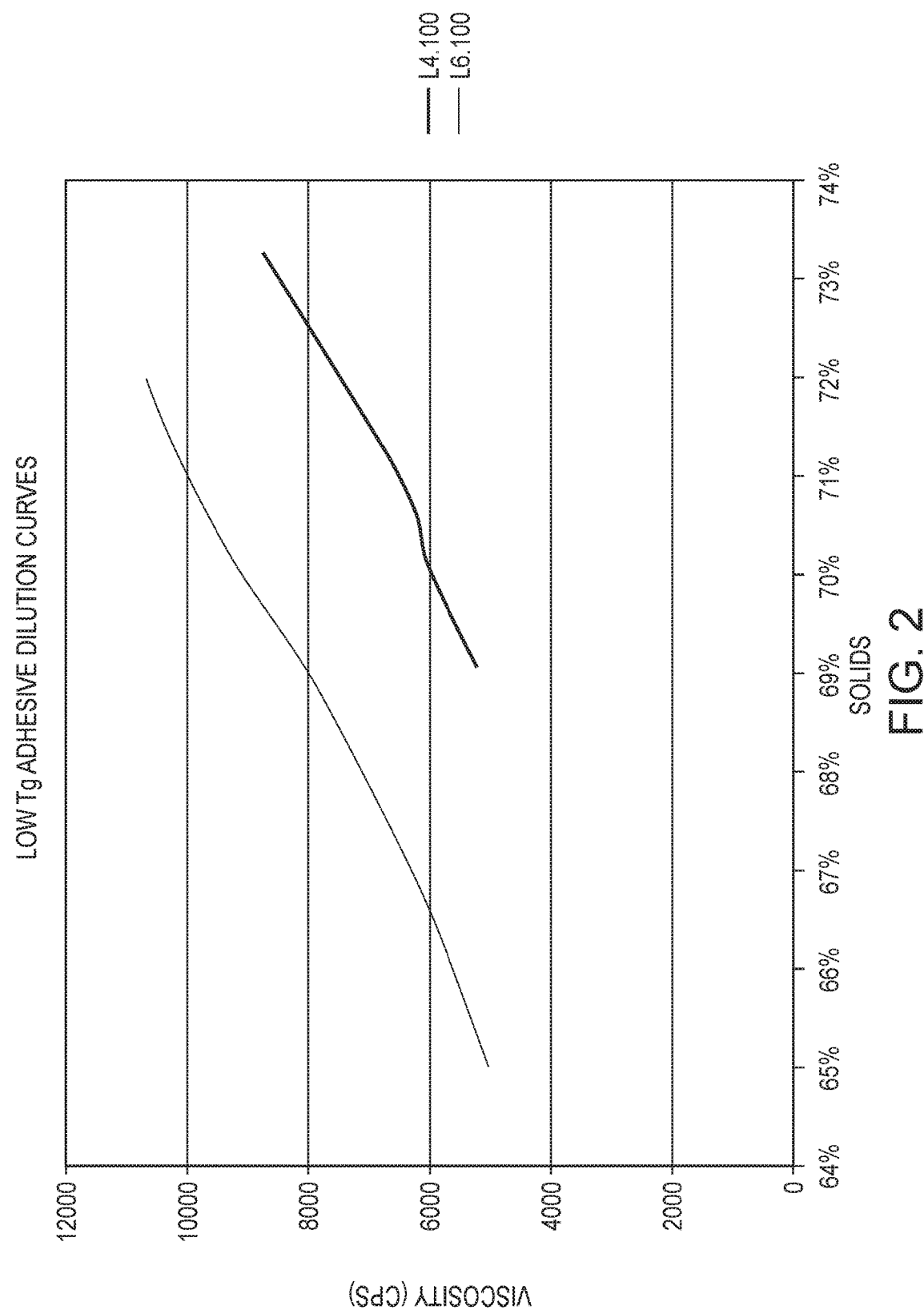
FIG. 2 is a graph of viscosity as a function of solids content for low glass transition temperature polymeric samples described herein.

FIG. 1 is a graph of viscosity as a function of solids content for several preferred embodiment polymers described herein. Specifically, these "high acid" polymers are prepared and evaluated as described in greater detail herein. FIG. 2 is a similar graph of viscosity as a function of solids content for two preferred embodiment polymers described herein. Specifically, these "low acid" polymers are prepared and evaluated in greater detail herein.

EXAMPLES

The following test methods were used for evaluating the adhesive properties of the acrylic adhesives.

Various 180° peel tests were used in evaluating preferred embodiment pressure sensitive adhesives prepared from preferred embodiment acrylic polymers. Also performed were shear strength tests and shear adhesion failure temperature tests (SAFT). These tests were performed as summarized in Table 2.

TABLE 2

| Pressure Sensitive Adhesive Performance Test Methods | |
|---|---|
| Test | Condition |
| 180° Peel<br>15 Minute Dwell<br>24 Hour Dwell<br>72 Hour Dwell | a, b |
| Shear Strength | c |
| Shear Adhesion Failure Temp. (SAFT) | d | a Peel, sample applied to a stainless steel panel with a 5 pound roller with 1 pass in each direction. Samples conditioned and tested at 23° C.
b Peel, sample applied to a high density polyethylene (HDPE) or polypropylene (PP) with a 5 pound roller with 5 passes in each direction. Samples conditioned and tested at 23° C.
c Shear: 1 kg weight with a ½ inch by 1 inch overlap. Sample applied to a stainless steel panel with a 10 pound roller with 5 passes in each direction. Samples conditioned and tested at 23° C.
d SAFT: 1000 gram weight, 1 inch by 1 inch overlap (2.2 pounds/square inch). Sample applied to a stainless steel panel with a 10 pound roller with 5 passes in each direction. Samples conditioned for 1 hour at 23° C. and 15 minutes at 40° C. Temperature increased by 0.5° C./min. until failure.

The subject matter is further described by reference to the following non-limiting examples.

Example 1

Epoxy Hybrid Functional Acrylic Polymer

An acrylic copolymer with reactive functionalities positioned in the segment adjacent to the polymer chain ends is prepared as follows. Into a 1500 ml vessel equipped with a heating jacket, agitator, reflux condenser, feed tanks and nitrogen gas inlet there is charged 65.06 g of ethyl acetate and 10.50 g of methanol. Monomers and RAFT agent are added in the following amounts to generate the segment adjacent to the polymer chain ends:

- 36.53 g butyl acrylate
- 41.57 g of 2 ethyl-hexyl acrylate
- 4.87 g of dibenzyl trithiocarbonate (RAFT agent 50% solution in ethyl acetate)
- 6.58 g of 3,4 epoxycyclohexyl methyl methacrylate (cyclo aliphatic epoxy)
- 0.275 g of VAZO® 64 (AIBN)

After a 30 minute reactor sparge with nitrogen at room temperature, the reactor charge is heated to reflux conditions (reactor jacket 95° C.) with a constant nitrogen purge. After a peak temperature of 75-78° C. is attained, the reaction conditions are maintained for 30 minutes at which point >70% of the monomers are consumed. A reagent feed mixture with an active nitrogen purge of 230.38 g ethyl acetate, 31.49 g of methanol, 374.13 g 2-ethyl-hexyl acrylate, 328.78 g butyl acrylate, 58.79 g of acrylic acid, and 0.28 g VAZO® 64 is added over a period of two and one half hours to the reactor. VAZO® 64 is a free radical source, commercially available from DuPont. Over the reagent feed the temperature of the reaction under reflux is held under 85° C. The reaction conditions are maintained for 3 hours after completion of the reagent feed at which point >97.0% of the monomers are consumed. The resulting solution polymer is then cooled to ambient and discharged from the reactor.

The resulting acrylic polymer contains 43.2% butyl acrylate, 49.1% 2-ethyl-hexyl acrylate, 7% acrylic acid and 0.70% 3,4 epoxycyclohexyl methyl methacrylate based on 100% by weight of the acrylic polymer. The measured molecular weight (Mn) of the acrylic polymer is 51,991 (determined by gel permeation chromatography relative to polystyrene standards) and the polydispersity is 2.12.

0.4% based on solids aluminum acetyl acetonate (AAA) was added to the acrylic polymer. The adhesive composition is air dried for 5 minutes then placed into an air forced oven at 120° C. for 10 minutes.

The adhesives are coated onto 2-mil polyethylene terephthalate at 58-62 grams per square meter (gsm) and air dried for 5 minutes followed by a 10 minute 120° C. dry.

Example 2

Epoxy Hybrid Functional Acrylic Polymer

An acrylic copolymer with reactive functionalities positioned in the segment adjacent to the polymer chain ends is prepared as follows. Into a 1500 ml vessel equipped with a heating jacket, agitator, reflux condenser, feed tanks and nitrogen gas inlet there is charged 65.26 g of ethyl acetate and 10.53 g of methanol. Monomers and RAFT agent are added in the following amounts to generate the segment adjacent to the polymer chain ends:

- 37.05 g butyl acrylate
- 42.11 g of 2-ethyl-hexyl acrylate
- 4.88 g of dibenzyl trithiocarbonate (RAFT agent 50% solution in ethyl acetate)
- 3.30 g of 3,4 epoxycyclohexyl methyl methacrylate (cyclo aliphatic epoxy)
- 0.276 g of VAZO® 64 (AIBN)

After a 30 minute reactor sparge with nitrogen at room temperature, the reactor charge is heated to reflux conditions (reactor jacket 95° C.) with a constant nitrogen purge. After a peak temperature of 75-78° C. is attained, the reaction conditions are maintained for 30 minutes at which point >70% of the monomers are consumed. A reagent feed mixture with an active nitrogen purge of 135.79 g ethyl acetate, 31.58 g of methanol, 378.95 g 2-ethyl-hexyl acrylate, 333.47 g butyl acrylate, 50.53 g of acrylic acid, and 0.28 g Vazo-64 is added over a period of two and one half hours to the reactor. Over the reagent feed the temperature of the reaction under reflux is held under 85° C. The reaction conditions are maintained for 3 hours after completion of the reagent feed at which point >97.0% of the monomers are consumed. The resulting solution polymer is then cooled to ambient and discharged from the reactor.

The resulting acrylic polymer contains 43.8% butyl acrylate, 49.8% 2-ethyl-hexyl acrylate, 6% acrylic acid and 0.40% 3,4 epoxycyclohexyl methyl methacrylate based on 100% by weight of the acrylic polymer. The measured molecular weight (Mn) of the acrylic polymer is 62,898 (determined by gel permeation chromatography relative to polystyrene standards) and the polydispersity is 1.53.

0.7% based on solids aluminum acetyl acetonate was added to the acrylic polymer. The adhesive composition is air dried for 5 minutes then placed into an air forced oven at 120° C. for 10 minutes.

The adhesives are coated onto 2-mil polyethylene terephthalate at 58-62 grams per square meter (gsm) and air dried for 5 minutes followed by a 10 minute 120° C. dry.

Example 3

Epoxy Hybrid Functional Acrylic Polymer

An acrylic copolymer with reactive functionalities positioned in the segment adjacent to the polymer chain ends is prepared as follows. Into a 1500 ml vessel equipped with a heating jacket, agitator, reflux condenser, feed tanks and nitrogen gas inlet there is charged 59.02 g of ethyl acetate and 9.52 g of methanol. Monomers and RAFT agent are added in the following amounts to generate the segment adjacent to the polymer chain ends:

- 34.27 g butyl acrylate
- 38.84 g of 2-ethyl-hexyl acrylate
- 2.94 g of dibenzyl trithiocarbonate (RAFT agent 50% solution in ethyl acetate)
- 1.99 g of 3,4 epoxycyclohexyl methyl methacrylate (cyclo aliphatic epoxy)
- 0.083 g of VAZO® 64 (AIBN)

After a 30 minute reactor sparge with nitrogen at room temperature, the reactor charge is heated to reflux conditions (reactor jacket 95° C.) with a constant nitrogen purge. After a peak temperature of 75-78° C. is attained, the reaction conditions are maintained for 30 minutes at which point >70% of the monomers are consumed. A reagent feed mixture with an active nitrogen purge of 230.38 g ethyl acetate, 28.5 g of methanol, 349.57 g 2-ethyl-hexyl acrylate, 308.45 g butyl acrylate, 30.46 g of acrylic acid, and 0.08 g VAZO® 64 is added over a period of two and one half hours to the reactor. Over the reagent feed the temperature of the reaction under reflux is held under 85° C. The reaction conditions are maintained for 3 hours after completion of the reagent feed at which point >97.0% of the monomers are consumed. The resulting solution polymer is then cooled to ambient and discharged from the reactor.

The resulting acrylic polymer contains 44.9% butyl acrylate, 50.8% 2-ethyl-hexyl acrylate, 4% acrylic acid and 0.3% 3,4 epoxycyclohexyl methyl methacrylate based on 100% by weight of the acrylic polymer. The measured molecular weight (Mn) of the acrylic polymer is 60,369 (determined by gel permeation chromatography relative to polystyrene standards) and the polydispersity is 1.79.

0.6% based on solids aluminum acetyl acetonate (AAA) was added to the acrylic polymer. The adhesive composition is air dried for 5 minutes then placed into an air forced oven at 120° C. for 10 minutes.

The adhesives are coated onto 2-mil polyethylene terephthalate at 58-62 grams per square meter (gsm) and air dried for 5 minutes followed by a 10 minute 120° C. dry.

Example 4

Preparation of Segmented Acrylic Polymer Having Epoxy Functionality in the Endblocks and Acid Functionality Throughout Using RAFT Agent An acrylic copolymer with segmented acrylic polymer having epoxy functionality in the endblocks and acid functionality throughout is prepared as follows. Into a 1500 ml reactor equipped with a heating jacket, agitator, reflux condenser, feed tanks and nitrogen gas inlet the following is charged:

142.50 g of butyl acetate
105.37 g of ethyl acetate
15.00 g of methanol
3.92 g of Synasia S-100 epoxy monomer
54.00 g of 2-ethylhexyl acrylate
36.61 g of methyl acrylate
9.00 g of acrylic acid
2.90 g of dibenzyl trithiocarbonate (DBTTC)
02.87 g of VAZO® 88 (polymerization initiator from DuPont)

Into a 1000 ml feed vessel fitted with nitrogen gas inlet, monomers and solvents are added in the following amounts to generate a portion of only acid functional reactive segment at the center of the polymer chain ends of the epoxy/acid reactive polymer mode:

105.20 g of ethyl acetate
34.87 g of methanol
486.00 g of 2-ethylhexyl acrylate
329.47 g of methyl acrylate
81.00 g of acrylic acid The reactor charge is heated to 80° C. (reactor jacket 95° C.) with a constant nitrogen purge and held for 30 minutes. After the hold, the reagent feed mixture with an active nitrogen purge is added over a period of 182 minutes to the reactor. During the reagent feed the temperature of the reaction is held between 80-85° C. The reaction conditions are maintained after completion of the reagent feed for 90 minutes. This is to create the remainder of the only acid reactive segment at the center of the polymer, the total theoretical Mn of the acid reactive segment is 90,000 g/mol. At this time, 0.87 g of t-amyl peroxy pivalate and 87.50 g of toluene are added and reaction conditions are maintained for 45 minutes. The resulting solution polymer is then cooled to ambient temperature and discharged from the reactor.

The resulting epoxy/acid reactive acrylic polymer contains 54.00% 2-ethylhexyl acrylate, 36.61% methyl acrylate, 9.00% acrylic acid, and 0.39% Synasia S-100 based on 100% by weight of the reactive acrylic polymer. The resulting acid only reactive polymer mode contains 54.00% 2-ethylhexyl acrylate, 37.00% methyl acrylate, and 9.00% acrylic acid. The measured molecular weight (Mn) of the total acrylic polymer is 57,197 g/Mole (determined by gel permeation chromatography relative to polystyrene standards) and the polydispersity is 1.89.

Aluminum acetoacetonate in an amount of 0.60% based on solids was added to the acrylic polymer. The adhesive composition is dried at 120° C. for 10 minutes to ensure complete crosslinking of the acrylic polymer.

Example 5

Preparation of Segmented Acrylic Polymer Having Epoxy Functionality in the Endblocks and Acid Functionality Throughout Using RAFT Agent An acrylic copolymer with segmented acrylic polymer having epoxy functionality in the endblocks and acid functionality throughout is prepared as follows. Into a 1500 ml reactor equipped with a heating jacket, agitator, reflux condenser, feed tanks and nitrogen gas inlet the following is charged:

142.50 g of butyl acetate
105.37 g of ethyl acetate
15.00 g of methanol
3.92 g of Synasia S-100 epoxy monomer
55.00 g of 2-ethylhexyl acrylate
37.61 g of methyl acrylate
7.00 g of acrylic acid
2.90 g of dibenzyl trithiocarbonate (DBTTC)
2.87 g of VAZO® 88

Into a 1000 ml feed vessel fitted with nitrogen gas inlet, monomers and solvents are added in the following amounts to generate a portion of only acid functional reactive segment at the center of the polymer chain ends of the epoxy/acid reactive polymer mode:

105.20 g of ethyl acetate
34.87 g of methanol
495.00 g of 2-ethylhexyl acrylate
338.47 g of methyl acrylate
63.00 g of acrylic acid The reactor charge is heated to 80° C. (reactor jacket 95° C.) with a constant nitrogen purge and held for 30 minutes. After the hold, the reagent feed mixture with an active nitrogen purge is added over a period of 182 minutes to the reactor. During the reagent feed the temperature of the reaction is held between 80-85° C. The reaction conditions are maintained after completion of the reagent feed for 90 minutes. This is to create the remainder of the only acid reactive segment at the center of the polymer, the total theoretical Mn of the acid reactive segment is 90,000 g/mol. At this time, 0.87 g of t-amyl peroxy pivalate and 87.50 g of toluene are added and reaction conditions are maintained for 45 minutes. The resulting solution polymer is then cooled to ambient temperature and discharged from the reactor.

The resulting epoxy/acid reactive acrylic polymer mode contains 55.00% 2-ethylhexyl acrylate, 37.61% methyl acrylate, 7.00% acrylic acid, and 0.39% Synasia S-100 based on 100% by weight of the reactive acrylic polymer mode. The resulting acid only reactive polymer mode contains 55.00% 2-ethylhexyl acrylate, 38.00% methyl acrylate, and 7.00% acrylic acid. The measured molecular weight (Mn) of the total acrylic polymer is 60,592 g/Mole (determined by gel permeation chromatography relative to polystyrene standards) and the polydispersity is 1.90.

Aluminum acetoacetonate in an amount of 0.60% based on solids was added to the acrylic polymer. The adhesive composition is dried at 120° C. for 10 minutes to ensure complete crosslinking of the acrylic polymer.

Example 6

Preparation of Segmented Acrylic Polymer Having Epoxy Functionality in the Endblocks and Acid Functionality Throughout Using RAFT Agent An acrylic copolymer with segmented acrylic polymer having epoxy functionality in the endblocks and acid functionality throughout is prepared as follows. Into a 1500 ml reactor equipped with a heating jacket, agitator, reflux condenser, feed tanks and nitrogen gas inlet the following is charged.

131.18 g of butyl acetate
97.00 g of ethyl acetate
13.81 g of methanol
2.41 g of Synasia S-100 epoxy monomer
49.71 g of 2-ethylhexyl acrylate
33.82 g of methyl acrylate
8.29 g of acrylic acid
1.78 g of dibenzyl trithiocarbonate (DBTTC)
1.76 g of VAZO® 88

Into a 1000 ml feed vessel fitted with nitrogen gas inlet, monomers and solvents are added in the following amounts to generate a portion of only acid functional reactive segment at the center of the polymer chain ends of the epoxy/acid reactive polymer mode:

131.18 g of ethyl acetate
32.11 g of methanol
447.40 g of 2-ethylhexyl acrylate
304.38 g of methyl acrylate
74.57 g of acrylic acid The reactor charge is heated to 80° C. (reactor jacket 95° C.) with a constant nitrogen purge and held for 60 minutes. After the hold, the reagent feed mixture with an active nitrogen purge is added over a period of 176 minutes to the reactor. During the reagent feed the temperature of the reaction is held between 80-85° C. The reaction conditions are maintained after completion of the reagent feed for 90 minutes. This is to create the remainder of the only acid reactive segment at the center of the polymer, the total theoretical Mn of the only acid reactive segment is 135,000 g/mol. At this time, 0.81 g of t-amyl peroxy pivalate and 80.55 g of butyl acetate are added and reaction conditions are maintained for 45 minutes. The resulting solution polymer is then cooled to ambient temperature, diluted with 87.46 g of butyl acetate and discharged from the reactor.

The resulting epoxy/acid reactive acrylic polymer mode contains 54.00% 2-ethylhexyl acrylate, 36.74% methyl acrylate, 9.00% acrylic acid, and 0.26% Synasia S-100 based on 100% by weight of the reactive acrylic polymer mode. The resulting acid only reactive polymer mode contains 54.00% 2-ethylhexyl acrylate, 37.00% methyl acrylate, and 9.00% acrylic acid. The measured molecular weight (Mn) of the total acrylic polymer is 63,887 g/mole (determined by gel permeation chromatography relative to polystyrene standards) and the polydispersity is 2.11.

Aluminum acetoacetonate in an amount of 0.60% based on solids was added to the acrylic polymer. The adhesive composition is dried at 120° C. for 10 minutes to ensure complete crosslinking of the acrylic polymer.

Example 7

Preparation of Segmented Acrylic Polymer Having Epoxy Functionality in the Endblocks and Acid Functionality Throughout Using RAFT Agent An acrylic copolymer with segmented acrylic polymer having epoxy functionality in the endblocks and acid functionality throughout is prepared as follows. Into a 1500 ml reactor equipped with a heating jacket, agitator, reflux condenser, feed tanks and nitrogen gas inlet the following is charged:

131.18 g of butyl acetate
92.40 g of ethyl acetate
13.81 g of methanol
2.41 g of Synasia S-100 epoxy monomer
50.63 g of 2-ethylhexyl acrylate
34.74 g of methyl acrylate
6.44 g of acrylic acid
1.78 g of dibenzyl trithiocarbonate (DBTTC)
1.76 g of VAZO® 88

Into a 1000 ml feed vessel fitted with nitrogen gas inlet, monomers and solvents are added in the following amounts to generate a portion of only acid functional reactive segment at the center of the polymer chain ends of the epoxy/acid reactive polymer mode.

131.18 g of ethyl acetate
32.11 g of methanol
455.69 g of 2-ethylhexyl acrylate
312.67 g of methyl acrylate
58.00 g of acrylic acid The reactor charge is heated to 80° C. (reactor jacket 95° C.) with a constant nitrogen purge and held for 60 minutes. After the hold, the reagent feed mixture with an active nitrogen purge is added over a period of 176 minutes to the reactor. During the reagent feed the temperature of the reaction is held between 80-85° C. The reaction conditions are maintained after completion of the reagent feed for 90 minutes. This is to create the remainder of the only acid reactive segment at the center of the polymer, the total theoretical Mn of the only acid reactive segment is 135,000 g/mol. At this time, 0.81 g of t-amyl peroxy pivalate and 80.55 g of butyl acetate are added and reaction conditions are maintained for 45 minutes. The resulting solution polymer is then cooled to ambient temperature, diluted with 87.46 g of butyl acetate and discharged from the reactor.

The resulting epoxy/acid reactive acrylic polymer mode contains 55.00% 2-ethylhexyl acrylate, 37.74% methyl acrylate, 7.00% acrylic acid, and 0.26% Synasia S-100 based on 100% by weight of the reactive acrylic polymer mode. The resulting acid only reactive polymer mode contains 55.00% 2-ethylhexyl acrylate, 38.00% methyl acrylate, and 7.00% acrylic acid. The measured molecular weight (Mn) of the total acrylic polymer is 76,119 g/mole (determined by gel permeation chromatography relative to polystyrene standards) and the polydispersity is 2.07.

Aluminum acetoacetonate in an amount of 0.60% based on solids was added to the acrylic polymer. The adhesive composition is dried at 120° C. for 10 minutes to ensure complete crosslinking of the acrylic polymer.

The adhesives were coated onto 2-mil aluminum foil at 58-62 grams per square meter (gsm) and dried at 120° C. for 10 minutes.

Adhesives of Examples 1-7

Table 3 set forth below summarizes wet physical properties of adhesives prepared using the polymers of Examples 1-7 and two commercially available adhesives. Table 4 summarizes pressure sensitive adhesive properties of adhesives prepared using the polymers of Examples 1-7 and two commercially available adhesives. The first commercial adhesive designated as "Commercial Adhesive 1" in Tables 3 and 4 is compositionally comparable to the preferred embodiment adhesives of Examples 1-3. And, the second commercial adhesive designated as "Commercial Adhesive 2" in Tables 3 and 4 is compositionally comparable to the preferred embodiment adhesives of Examples 4-7. Referring to Table 3, it will be noted that the preferred embodiment adhesives of Examples 1-7 exhibit a significantly narrower range of molecular weights and polydispersity values, for example Pdi values range from 1.41 to 2.11 as compared to the molecular weight ranges and polydispersity values of the two commercially available adhesives, i.e. Pdi values of 6.2 and 6.75. In addition, the preferred embodiment adhesives of Examples 1-7 exhibit a significantly higher solids content (i.e. 62% to 73%) as compared to that of the two commercially available adhesives (i.e. 36% to 50%).

Referring to Table 4, it is evident that the PSA performance of the preferred embodiment adhesives of Examples 1-7 are comparable to and in certain instances, significantly superior to those of the two commercially available adhesives.

TABLE 3

Wet Physical Properties of Adhesives of Polymers of Examples 1-7

| Sample Name | Acid Monomers | Level | $T_g$ (deg C.) | Molecular Weight Targeted | Mn | Mw | Pdi | % Solids | Viscosity (cps) |
|---|---|---|---|---|---|---|---|---|---|
| Example 1 | EHA/BA | 7 | −60 | 100 | | | | | |
| Example2 | EHA/BA | 6 | −60 | 100 | 62898 | 96248 | 1.53 | 72 | 10640 |
| Example 3 | EHA/BA | 4 | −60 | 100 | 60506 | 85370 | 1.41 | 73 | 8300 |
| Commercial Adhesive 1 | EHA/BA | 4 | −60 | NA | 57000 | 350000 | 6.2 | 50 | 4000 |
| Example 4 | EHA/MA | 9 | −35 | 100 | 57197 | 107980 | 1.89 | 71 | 45400 |
| Example 5 | EHA/MA | 7 | −35 | 100 | 60592 | 115500 | 1.91 | 72 | 31160 |
| Example 6 | EHA/MA | 9 | −35 | 150 | 63887 | 134520 | 2.11 | 62 | 32080 |
| Example 7 | EHA/MA | 7 | −35 | 150 | 76119 | 157670 | 2.07 | 63 | 28800 |
| Commercial Adhesive 2 | EHA/MA | 7 | −35 | NA | 105000 | 709000 | 6.75 | 36 | 13000 |

TABLE 4

Properties of Adhesives of Polymers of Examples 1-7

| Sample Name | 180° Peel SS 15 min (pli) | 180° Peel SS 24 hr (pli) | 180° Peel SS 72 hr (pli) | 180° Peel HDPE 72 hr (pli) | 180° Peel PP 72 hr (pli) | 8.8 lbs/in$^2$ Shear (min) | SAFT (° C.) |
|---|---|---|---|---|---|---|---|
| Example 1 | 5.15 m | 5.55 m | 5.71 m | 0.38 a | 3.05 a | 1904 m | >200 |
| Example 2 | 3.01 a | 7.03 c | 9.06 c | 0.44 a | 2.56 a | 199 m | >200 |
| Example 3 | 2.66 a | 5.47 m | 6.78 m | 0.4 a | 2.72 a | 92.0 a | >200 |
| Commercial Adhesive 1 | 5.64 m | 7.05 c | 7.85 c | 0.55 a | 2.56 a | 52.0 c | 90 c |
| Example 4 | 4.39 a | 5.39 a | 6.18 a | NA | NA | >10000 | >200 |
| Example 5 | 3.48 a | 5.21 a | 6.03 a | NA | NA | >10000 | >200 |
| Example 6 | 4.12 a | 5.64 a | 6.04 a | NA | NA | >10000 | >200 |
| Example 7 | 4.04 a | 4.79 a | 5.48 a | NA | NA | >10000 | >200 |
| Commercial Adhesive 2 | 4.07 a | 5.25 a | 5.70 a | NA | NA | >10000 | >200 |

Examples 8-23

Analysis and Investigation of Polymers with High and Low Glass Transition Temperatures

Example 8

Various samples of polymers having high glass transition temperatures (Tg), e.g., about −35° C., and low glass transition temperatures, e.g., about −60° C., were prepared. Two different molecular weights were targeted: 100,000 (or "100" as noted below) and 150,000 (or "150"). Hybrid epoxy functional polymers were formed from loadings of 4%, 6%, 7%, and 9% on monomers of acrylic acid. Tables 3-5 summarize these polymers. In the sample name designations, L is for low Tg, H is for high Tg, 4 is for 4% acid, 6 is for 6% acid, 7 is for 7% acid, 9 is for 9% acid, 150 is for 150K molecular weight, and 100 is for 100K molecular weight.

TABLE 5

Summary of Examples and Sample Properties

| Sample Name | Prepared According to |
|---|---|
| L6.100 | Example 2 |
| L4.100 | Example 3 |
| H9.100 | Example 4 |
| H7.100 | Example 5 |
| H9.150 | Example 6 |
| H7.150 | Example 7 |

Example 9

The performance of two high Tg samples, i.e. H9.100 and H9.150, were compared to one another. All samples were direct coated to 2 mil mylar at 60 gsm+1-3, air dried for 5 min. followed by 10 min. in a 120° C. forced air oven. All samples were conditioned for 24 hours in a controlled climate room. A summary of the samples and results of performance testing are set forth below in Tables 6A and 6B. Throughout these tables, "MOF" refers to mode of failure. "Zip" refers to quick zipping peels. "Sp" refers to cohesive splitting. "Re" refers to removed. Regarding the samples, "% BOS" refers to percent based on solids content. And "WPI" refers to Williams Plasticity Index.

TABLE 6A

Test Results for Samples H9.100 and H9.150

| | | | 180 DEG SS PEEL | | | | | |
|---|---|---|---|---|---|---|---|---|
| Sample | XLINKER | % BOS | 15 MIN | MOF | AVG | 24 HR | AVG | 72 HR | AVG |
| H9.100 | | | 4.71 | | | 5.86 | | 6.68 | |
| | | | 5.06 | | 4.88 | 5.99 | 5.94 | 6.91 | 6.76 |
| | | | 4.86 | | | 5.97 | | 6.7 | |
| H9.100 | 1:3:9 AAA | 0.20% | 4.6 | | | 5.25 | | 6.94 | |
| | | | 4.96 | | 4.74 | 5.87 | 5.73 | 6.73 | 7.00 |
| | | | 4.65 | | | 6.06 | | 7.32 | |
| H9.100 | 1:3:9 AAA | 0.40% | 3.78 | | | 5.95 | | 6.42 | |
| | | | 3.45 | zip | 4.23 | 4.68 | 5.57 | 5.31 | 6.11 |
| | | | 5.45 | | | 6.09 | | 6.6 | |
| H9.100 | 1:3:9 AAA | 0.60% | 4.6 | | | 5.47 | | 6.23 | |
| | | | 4.64 | | 4.39 | 5.04 | 5.39 | 5.76 | 6.18 |
| | | | 3.93 | zip | | 5.65 | | 6.54 | |
| H9.100 | 1:3:9 AAA | 0.80% | 3.42 | zip | | 5.45 | | 6.05 | |
| | | | 3.89 | zip | 3.73 | 5.32 | 5.39 | 5.93 | 6.09 |
| | | | 3.89 | zip | | 5.4 | | 6.28 | |
| H9.150 | 1:3:9 AAA | 0.20% | 3.7 | | | 5.31 | | 5.96 | |
| | | | 4.19 | | 4.12 | 6.15 | 5.64 | 6.58 | 6.04 |
| | | | 4.46 | | | 5.47 | | 5.58 | |
| H9.150 | 1:3:9 AAA | 0.40% | 3.77 | | | 5.47 | | 5.92 | |
| | | | 3.97 | | 3.66 | 5.46 | 5.25 | 5.54 | 5.65 |
| | | | 3.24 | | | 4.81 | | 5.48 | |
| H9.150 | 1:3:9 AAA | 0.60% | 3.2 | | | 5.31 | | 5.71 | |
| | | | 3.33 | | 3.26 | 5 | 5.05 | 5.57 | 5.62 |
| | | | 3.25 | | | 4.84 | | 5.58 | |
| H9.150 | 1:3:9 AAA | 0.80% | 3.24 | | | 4.93 | | 4.8 | |
| | | | 3.02 | | 3.38 | 5.1 | 4.94 | 5.32 | 5.04 |
| | | | 3.89 | | | 4.8 | | 4.99 | |

TABLE 6B

Test Results for Samples H9.100 and H9.150

| | | | 8.8 LB PER SQ IN SHEAR | | | WPI | |
|---|---|---|---|---|---|---|---|
| Sample | XLINKER | % BOS | MIN | MOF | AVG | VALUE | AVG |
| H9.100 | | | 39.1 | sp | | NA | |
| | | | 28.5 | sp | 33.27 | | |
| | | | 32.2 | sp | | | |
| H9.100 | 1:3:9 AAA | 0.20% | 422.7 | sp | | 1.9 | |
| | | | 473.7 | sp | 439.23 | 2.1 | 2 |
| | | | 421.3 | sp | | | |
| H9.100 | 1:3:9 AAA | 0.40% | 10000 | re | | 3.3 | |
| | | | 10000 | re | 10000.00 | 3.31 | 3.305 |
| | | | 10000 | re | | | |
| H9.100 | 1:3:9 AAA | 0.60% | 10000 | re | | 4.3 | |
| | | | 10000 | re | 10000.00 | 4.3 | 4.3 |
| | | | 10000 | re | | | |
| H9.100 | 1:3:9 AAA | 0.80% | 10000 | re | | 4.58 | |
| | | | 10000 | re | 10000.00 | 4.59 | 4.585 |
| | | | 10000 | re | | | |
| H9.150 | 1:3:9 AAA | 0.20% | 10000 | re | | 3.07 | |
| | | | 10000 | re | 10000.00 | 3.15 | 3.11 |
| | | | 10000 | re | | | |
| H9.150 | 1:3:9 AAA | 0.40% | 10000 | re | | 4.41 | |
| | | | 10000 | re | 10000.00 | 4.85 | 4.63 |
| | | | 10000 | re | | | |
| H9.150 | 1:3:9 AAA | 0.60% | 10000 | re | | 5.27 | |
| | | | 10000 | re | 10000.00 | 5.97 | 5.62 |
| | | | 10000 | re | | | |
| H9.150 | 1:3:9 AAA | 0.80% | 10000 | re | | 5.48 | |
| | | | 10000 | re | 10000.00 | 5.99 | 5.735 |
| | | | 10000 | re | | | |

Example 10

The performance of two high Tg samples H7.100 and H7.150, were similarly compared to one another. All samples were direct coated to 2 mil mylar at 60 gsm+/−3, air dried for 5 min. followed by 10 min. in a 120° C. forced air oven. All samples were conditioned for 24 hours by a controlled climate room. A summary of the samples and results of performance testing are set forth below in Tables 7A and 7B.

TABLE 7A

Test Results for Samples H7.100 and H7.150

| | | | 180 DEG SS PEEL | | | | | |
|---|---|---|---|---|---|---|---|---|
| Sample | XLINKER | % BOS | 15 MIN | AVG | 24 HR | AVG | 72 HR | AVG |
| H7.100 | 1:1:9 AAA | 0.50% | 2.96 | | 3.45 | | 5.37 | |
| | | | 4.64 | 3.99 | 4.48 | 4.14 | 5.71 | 5.57 |
| | | | 4.38 | | 4.49 | | 5.64 | |
| H7.100 | 1:1:9 AAA | 0.60% | 4.12 | | 4.19 | | 5.38 | |
| | | | 3.11 | 3.61 | 4.08 | 4.15 | 5.24 | 5.34 |
| | | | 3.59 | | 4.19 | | 5.41 | |
| H7.100 | 1:1:9 AAA | 0.70% | 3.26 | | 4.48 | | 5.39 | |
| | | | 3.67 | 3.41 | 3.85 | 4.15 | 4.82 | 5.25 |
| | | | 3.29 | | 4.12 | | 5.53 | |
| H7.100 | 1:1:9 AAA | 0.80% | 3.29 | | 3.77 | | 4.85 | |
| | | | 3.36 | 3.44 | 3.66 | 3.70 | 4.99 | 4.99 |
| | | | 3.67 | | 3.66 | | 5.17 | |
| H7.150 | 1:1:9 AAA | 0.50% | 4.74 | | 4.31 | | 3.85 | |
| | | | 4.53 | 4.42 | 3.83 | 4.44 | 3.97 | 4.54 |
| | | | 4 | | 5.18 | | 5.8 | |
| H7.150 | 1:1:9 AAA | 0.60% | 3.85 | | 4.39 | | 5.12 | |
| | | | 3.98 | 4.04 | 4.95 | 4.79 | 5.58 | 5.48 |
| | | | 4.3 | | 5.02 | | 5.73 | |
| H7.150 | 1:1:9 AAA | 0.70% | 4.25 | | 4.66 | | 5.32 | |
| | | | 3.84 | 4.12 | 4.43 | 4.58 | 5.08 | 5.15 |
| | | | 4.26 | | 4.64 | | 5.06 | |

TABLE 7B

Test Results for Samples H7.100 and H7.150

| Sample | XLINKER | % BOS | MIN | MOF | AVG | WPI VALUE | AVG |
|---|---|---|---|---|---|---|---|
| | | | 8.8 LB PER SQ IN SHEAR | | | | |
| H7.100 | 1:1:9 AAA | 0.50% | 8300 | re | | 4.16 | |
| | | | 8300 | re | 8300.00 | 4.01 | 4.085 |
| | | | 8300 | re | | | |
| H7.100 | 1:1:9 AAA | 0.60% | 8300 | re | | 4.4 | |
| | | | 8300 | re | 8300.00 | 4.11 | 4.255 |
| | | | 8300 | re | | | |
| H7.100 | 1:1:9 AAA | 0.70% | 8300 | re | | 5.1 | |
| | | | 8300 | re | 8300.00 | 4.8 | 4.95 |
| | | | 8300 | re | | | |
| H7.100 | 1:1:9 AAA | 0.80% | 8300 | re | | 5.01 | |
| | | | 8300 | re | 8300.00 | 5.03 | 5.02 |
| | | | 8300 | re | | | |
| H7.150 | 1:1:9 AAA | 0.50% | 8300 | re | | 4.11 | |
| | | | 8300 | re | 8300.00 | 5.2 | 4.655 |
| | | | 8300 | re | | | |
| H7.150 | 1:1:9 AAA | 0.60% | 8300 | re | | 4.25 | |
| | | | 8300 | re | 8300.00 | 5.57 | 4.91 |
| | | | 8300 | re | | | |
| H7.150 | 1:1:9 AAA | 0.70% | 8300 | re | | 5.71 | |
| | | | 8300 | re | 8300.00 | 5.5 | 5.605 |
| | | | 8300 | re | | | |

Example 11

The performance of two low Tg samples L4.100 and L6.100, were compared to one another. All samples were direct coated to 2 mil mylar at 60 gsm+1-3, air dried for 5 min. followed by 10 min. in a 120° C. forced air oven. All samples were conditioned for 24 hours in a controlled climate room. A summary of the samples and results of performance testing are set forth below in Tables 8A and 8B.

TABLE 8A

Test Results for Samples L.100 and L6.100

| SAMPLE | AAA | % BOS | 15 MIN | MOF | AVG | 24 HR | MOF | AVG | 72+ HR | MOF | AVG |
|---|---|---|---|---|---|---|---|---|---|---|---|
| | | | 180 DEG SS PEEL | | | | | | | | |
| L4.100 | 1:1:8 AAA | 0.40% | 3.84 | sp | | 4.06 | sp | | 4.14 | sp | |
| | | | 4.01 | sp | 3.93 | 4.19 | sp | 4.11 | 4.21 | sp | 4.14 |
| | | | 3.95 | sp | | 4.08 | sp | | 4.08 | sp | |
| L4.100 | 1:1:8 AAA | 0.50% | 4.52 | sp | | 4.52 | sp | | 4.60 | sp | |
| | | | 4.63 | sp | 4.55 | 4.53 | sp | 4.53 | 4.69 | sp | 4.64 |
| | | | 4.50 | sp | | 4.53 | sp | | 4.64 | sp | |
| L4.100 | 1:1:8 AAA | 0.60% | 5.05 | sp | | 5.17 | sp | | 5.24 | sp | |
| | | | 5.31 | sp | 5.27 | 5.35 | sp | 5.28 | 5.45 | sp | 5.40 |
| | | | 5.44 | sp | | 5.31 | sp | | 5.50 | sp | |
| L4.100 | 1:1:8 AAA | 0.70% | 5.44 | sp | | 5.50 | sp | | 5.72 | sp | |
| | | | 5.60 | sp | 5.56 | 5.55 | sp | 5.55 | 5.76 | sp | 5.74 |
| | | | 5.63 | sp | | 5.60 | sp | | 5.74 | sp | |
| L4.100 | 1:1:8 AAA | 0.80% | 2.55 | | | 5.64 | sp | | 6.11 | sp | |
| | | | 2.40 | | 2.64 | 5.87 | sp | 5.27 | 6.21 | sp | 6.21 |
| | | | 2.96 | | | 4.30 | | | 6.30 | sp | |
| L6.100 | 1:1:8 AAA | 0.40% | 7.38 | sp | | 7.46 | sp | | 7.83 | sp | |
| | | | 7.58 | sp | 7.65 | 7.58 | sp | 7.52 | 7.86 | sp | 7.82 |
| | | | 7.98 | sp | | 7.53 | sp | | 7.76 | sp | |
| L6.100 | 1:1:8 AAA | 0.50% | 8.58 | sp | | 8.04 | sp | | 8.42 | sp | |
| | | | 7.25 | sp | 8.04 | 8.36 | sp | 8.26 | 8.48 | sp | 8.47 |
| | | | 8.28 | sp | | 8.36 | | | 8.51 | sp | |
| L6.100 | 1:1:8 AAA | 0.60% | 7.83 | p tr | | 8.35 | sp | | 8.44 | sp | |
| | | | 6.10 | p tr | 5.96 | 6.12 | lt tr | 7.18 | 3.78 | lt tr | 6.95 |
| | | | 3.94 | p tr | | 7.07 | sp | | 8.62 | sp | |
| L6.100 | 1:1:8 AAA | 0.70% | 3.40 | | | 7.03 | p tr/sp | | 9.07 | sp | |
| | | | 2.82 | | 3.01 | 5.17 | p tr | 7.03 | 8.83 | p sp | 9.307 |
| | | | 2.82 | | | 8.89 | sp | | 9.30 | sp | |
| L6.100 | 1:1:8 AAA | 0.80% | 3.10 | | | 4.91 | | | 6.11 | | |
| | | | 3.08 | | 2.98 | 4.87 | | 4.91 | 5.14 | | 6.11 |
| | | | 2.77 | | | 4.95 | | | 7.07 | p tr | |

In Table 8A and other tables, "p tr" refers to partial adhesive transfer. And "lt tr" refers to light partial adhesive transfer. And "p tr/sp refers to partial cohesive splitting.

TABLE 8B

Test Results for Samples L.100 and L6.100

| SAMPLE | AAA | % BOS | ½" × ½" × 1 kg SHEAR | | |
|---|---|---|---|---|---|
| | | | MIN | MOF | AVG |
| L4.100 | 1:1:8 AAA | 0.40% | 1.6 | sp | |
| | | | 1.3 | sp | 1.45 |
| L4.100 | 1:1:8 AAA | 0.50% | 13.3 | sp | |
| | | | 11 | sp | 12.15 |
| L4.100 | 1:1:8 AAA | 0.60% | 24.7 | sp | |
| | | | 28.1 | sp | 26.40 |
| L4.100 | 1:1:8 AAA | 0.70% | 50.4 | sp | |
| | | | 62.1 | sp | 56.25 |
| L4.100 | 1:1:8 AAA | 0.80% | 84.9 | sp | |
| | | | 89.4 | sp | 87.15 |
| L6.100 | 1:1:8 AAA | 0.40% | 24.9 | sp | |
| | | | 25.1 | sp | 25.00 |
| L6.100 | 1:1:8 AAA | 0.50% | 87.2 | sp | |
| | | | 79 | sp | 83.10 |
| L6.100 | 1:1:8 AAA | 0.60% | 207.5 | sp | |
| | | | 162.5 | sp | 185.00 |

TABLE 8B-continued

Test Results for Samples L.100 and L6.100

| SAMPLE | AAA | % BOS | ½" × ½" × 1 kg SHEAR | | |
|---|---|---|---|---|---|
| | | | MIN | MOF | AVG |
| L6.100 | 1:1:8 AAA | 0.70% | 196.5 | adh | |
| | | | 201.8 | adh | 199.15 |
| L6.100 | 1:1:8 AAA | 0.80% | 105.4 | adh | |
| | | | 77.7 | adh | 91.55 |

In Table 8B and other tables, "adh" refers to adhesive failure.

Example 12

The performance of one of the high Tg samples H7.150 was evaluated in a coatweight study. All samples were direct coated to 2 mil. Mylar at designated coatweight, air dried for 5 min. followed by 120° C. for 10 minutes. All samples were conditioned for 24 hours in a controlled climate room. A summary of the samples and results of performance testing are set forth below in Tables 9A and 9B.

TABLE 9A

Test Results for Sample H7.150

| SAMPLE | AAA CW | % BOS | 180 DEG SS PEEL | | | | | |
|---|---|---|---|---|---|---|---|---|
| | | | 15 MIN | AVG | 24 HR | AVG | 72 HR | AVG |
| H7.150 | 30 GSM | 0.50% | 2.42 | | 4.34 | | 5.27 | |
| | | | 2.64 | 2.59 | 5.48 | 4.94 | 6.34 | 5.53 |
| | | | 2.72 | | 5 | | 4.97 | |
| H7.150 | 40 GSM | 0.50% | 3.59 | | 5.31 | | 5.23 | |
| | | | 3.33 | 3.24 | 5.21 | 5.06 | 5.42 | 5.09 |
| | | | 2.79 | | 4.66 | | 4.61 | |
| H7.150 | 50 GSM | 0.50% | 5.36 | | 6.63 | | 6.65 | |
| | | | 4.71 | 5.03 | 6.79 | 6.84 | 6.94 | 6.89 |
| | | | 5.01 | | 7.1 | | 7.09 | |

TABLE 9B

Test Results for Sample H7.150

| SAMPLE | AAA CW | % BOS | 8.8 LB PER SQ IN SHEAR | | 65 C. 1 × 1 × 5 LB SHEARS | | | SAFT | |
|---|---|---|---|---|---|---|---|---|---|
| | | | MIN | AVG | MIN | SLIP/MOF | AVG | DEG C. MOF | AVG |
| H7.150 | 30 GSM | 0.50% | 10000 | | 360 | .2 mm | | 200 pass | |
| | | | 10000 | 10000.00 | 360 | .1 mm | 360 | 200 pass | 200 |
| | | | 10000 | | 360 | .1 mm | | 200 pass | |
| H7.150 | 40 GSM | 0.50% | 10000 | | 360 | .2 mm | | 200 pass | |
| | | | 10000 | 10000.00 | 360 | .2 mm | 360 | 200 pass | 200 |
| | | | 10000 | | 360 | .2 mm | | 200 pass | |
| H7.150 | 50 GSM | 0.50% | 10000 | | 360 | .2 mm | | 200 pass | |
| | | | 10000 | 10000.00 | 360 | .1 mm | 360 | 200 pass | 200 |
| | | | 10000 | | 360 | .1 mm | | 200 pass | |

Example 13

The performance of two high Tg samples H9.100 and H7.100, was evaluated in a coatweight study. All samples were direct coated to aluminum foil at designated coatweight, air dried for 5 min. followed by 120° C. for 10 minutes. All samples were conditioned for 24 hours in a controlled climate room. A summary of the samples and results of performance testing are set forth below in Table 10.

TABLE 10

Test Results for Samples H9.100 and H7.100

| SAMPLE | 1:3:9 AAA % BOS | COAT WT | 180 DEG SS PEEL | | | | | | 8.8 LB PER SQ IN SHEAR | | |
|---|---|---|---|---|---|---|---|---|---|---|---|
| | | | 15 MIN | AVG | 24 HR | AVG | 72 HR | AVG | MIN | MOF | AVG |
| H9.100 | 0.60% | 30 gsm | 3 | | 4.91 | | 6.13 | | 10000 | re | |
| | | | 2.57 | 3.08 | 5.53 | 5.32 | 4.55 | 5.40 | 10000 | re | 10000.00 |
| | | | 3.67 | | 5.52 | | 5.51 | | 10000 | re | |
| | | 60 gsm | 5.22 | | 7.29 | | 6.85 | | 1647.3 | lt st | |
| | | | 4.84 | 5.01 | 7.01 | 7.04 | 6.5 | 6.61 | 10000 | re | 7215.77 |
| | | | 4.97 | | 6.82 | | 6.49 | | 10000 | re | |
| | | 120 gsm | 2.94 | | 4.61 | | 9.26 | | 362.4 | Lt st | |
| | | | 4.3 | 3.83 | 5.93 | 5.28 | 8.28 | 8.25 | 10000 | re | 6787.47 |
| | | | 4.26 | | 5.3 | | 7.21 | | 10000 | re | |
| H7.100 | 0.70% | 30 gsm | 4.37 | | 6.29 | | 4.98 | | 10000 | re | |
| | | | 3.98 | 3.85 | 5.42 | 5.93 | 5.22 | 5.28 | 10000 | re | 10000.00 |
| | | | 3.21 | | 6.09 | | 5.65 | | 10000 | re | |
| | | 60 gsm | 3.1 | | 4.85 | | 5.37 | | 10000 | re | |
| | | | 3.2 | 3.48 | 5.29 | 5.21 | 6.37 | 6.03 | 10000 | re | 10000.00 |
| | | | 4.14 | | 5.48 | | 6.34 | | 10000 | re | |
| | | 120 gsm | 4.53 | | 6.16 | | 7.37 | | 1993.3 | Lt st | |
| | | | 3.19 | 3.62 | 5.58 | 5.66 | 6.04 | 6.59 | 10000 | re | 7331.10 |
| | | | 3.15 | | 5.24 | | 6.36 | | 10000 | re | |

Example 14

Samples of a high Tg sample H9.150, were subjected to a drying study. All samples were direct coated to 2 mil mylar at 60+/−5 gsm, air dried for 5 min. followed by the designated temperatures for 10 min. All samples were conditioned for 24 hours in a controlled climate room. A summary is set forth below in Table 11.

TABLE 11

Test Results for Sample H9.150

| SAMPLE | XLINKER | % BOS | 180 DEG SS PEEL | | | | | | 8.8 LB PER SQ IN SHEAR | |
|---|---|---|---|---|---|---|---|---|---|---|
| | | | 15 MIN | AVG | 24 HR | AVG | 72 HR | AVG | MIN | AVG |
| H9.150 | 1:3:9 AAA | 0.20% | 3.76 | | 5.03 | | 5.6 | | 10000 | |
| | dried temp | 110 | 3.86 | 4.01 | 4.94 | 5.23 | 5.34 | 5.63 | 10000 | 10000.00 |
| | dry time | 10 | 4.4 | | 5.73 | | 5.95 | | 10000 | |
| H9.150 | 1:3:9 AAA | 0.20% | 4.77 | | 5.62 | | 5.95 | | 10000 | |
| | dried temp | 120 | 4.53 | 4.58 | 5.75 | 5.70 | 5.94 | 6.01 | 10000 | 10000.00 |
| | dry time | 10 | 4.43 | | 5.73 | | 6.14 | | 10000 | |
| H9.150 | 1:3:9 AAA | 0.20% | 3.85 | | 5.5 | | 5.77 | | 10000 | |
| | dried temp | 130 | 3.94 | 3.79 | 4.9 | 5.17 | 6.02 | 5.91 | 10000 | 10000.00 |
| | dry time | 10 | 3.59 | | 5.11 | | 5.94 | | 10000 | |
| H9.150 | 1:3:9 AAA | 0.20% | 3.34 | | 5.31 | | 5.87 | | 10000 | |
| | dried temp | 140 | 3.25 | 3.33 | 5.04 | 5.20 | 5.95 | 5.90 | 10000 | 10000.00 |
| | dry time | 10 | 3.4 | | 5.24 | | 5.88 | | 10000 | |

Example 15

Samples of low Tg polymers, e.g., L4.100 and L6.100, were subjected to quick stick testing. All samples were direct coated to 2 mil mylar at 60 gsm+1-3, air dried for 5 min. followed by 10 min. in a 120° C. forced air oven. All samples were conditioned for 24 hours in a controlled climate room. A summary of the samples and results of quick stick testing are set forth below in Tables 12A and 12B.

TABLE 12A

Test Results for Samples L4.100 and L6.100

| | | | 180 DEG SS PEEL | | | | |
|---|---|---|---|---|---|---|---|
| SAMPLE | AAA | % BOS | 15 MIN | MOF | AVG | 72+ HR | MOF | AVG |
| L4:100 | 1:1.8AAA | 0.40% | 3.84 | sp | | 4.14 | sp | |
| | | | 4.01 | sp | 3.93 | 4.21 | sp | 4.14 |
| | | | 3.95 | sp | | 4.08 | sp | |
| L4.100 | 1:1.8AAA | 0.50% | 4.52 | sp | | 4.60 | sp | |
| | | | 4.63 | sp | 4.55 | 4.69 | sp | 4.64 |
| | | | 4.50 | sp | | 4.64 | sp | |
| L4.100 | 1:1.8AAA | 0.60% | 5.05 | sp | | 5.24 | sp | |
| | | | 5.31 | sp | 5.27 | 5.45 | sp | 5.40 |
| | | | 5.44 | sp | | 5.50 | sp | |
| L4.100 | 1:1.8AAA | 0.70% | 5.44 | sp | | 5.72 | sp | |
| | | | 5.60 | sp | 5.56 | 5.76 | sp | 5.74 |
| | | | 5.63 | sp | | 5.74 | sp | |
| L4.100 | 1:1.8AAA | 0.80% | 2.55 | | | 6.11 | sp | |
| | | | 2.40 | | 2.64 | 6.21 | sp | 6.21 |
| | | | 2.96 | | | 6.30 | sp | |
| L6.100 | 1:1.8AAA | 0.40% | 7.38 | sp | | 7.83 | sp | |
| | | | 7.58 | sp | 7.65 | 7.86 | sp | 7.82 |
| | | | 7.98 | sp | | 7.76 | sp | |
| L6.100 | 1:1.8AAA | 0.50% | 8.58 | sp | | 8.42 | sp | |
| | | | 7.25 | sp | 8.04 | 8.48 | sp | 8.47 |
| | | | 8.28 | sp | | 8.51 | sp | |
| L6.100 | 1:1.8AAA | 0.60% | 7.83 | p tr | | 8.44 | sp | |
| | | | 6.10 | p tr | 5.96 | 3.78 | lt tr | 6.95 |
| | | | 3.94 | p tr | | 8.62 | sp | |
| L6.100 | 1:1.8AAA | 0.70% | 3.40 | | | 9.07 | sp | |
| | | | 2.82 | | 3.01 | 8.83 | p sp | 9.07 |
| | | | 2.82 | | | 9.30 | sp | |
| L6.100 | 1:1.8AAA | 0.80% | 3.10 | | | 6.11 | | |
| | | | 3.08 | | 2.98 | 5.14 | | 6.11 |
| | | | 2.77 | | | 7.07 | p tr | |

TABLE 12B

Test Results for Samples L4.100 and L6.100

| | | | ½" × ½" × 1 kg SHEAR | | | ROLLING BALL | | SS LOOPTACK | | |
|---|---|---|---|---|---|---|---|---|---|---|
| SAMPLE | AAA | % BOS | MIN | MOF | AVG | VALUE (mm) | AVG | VALUE (mm) | MOF | AVG |
| L4:100 | 1:1.8AAA | 0.40% | 1.6 | sp | | 40 | | 10.54 | tr | |
| | | | 1.3 | sp | 1.45 | 50 | 45 | 9.84 | tr | 10.19 |
| L4.100 | 1:1.8AAA | 0.50% | 13.3 | sp | | 60 | | 11.81 | tr | |
| | | | 11 | sp | 12.15 | 48 | 54 | 11.68 | tr | 9.51 |
| L4.100 | 1:1.8AAA | 0.60% | 24.7 | sp | | 65 | | 5.05 | | |
| | | | 28.1 | sp | 26.40 | 50 | 57.5 | 5.45 | | 5.25 |
| L4.100 | 1:1.8AAA | 0.70% | 50.4 | sp | | 50 | | 4.76 | | |
| | | | 62.1 | sp | 56.25 | 50 | 50 | 4.46 | | 4.61 |
| L4.100 | 1:1.8AAA | 0.80% | 84.9 | sp | | 50 | | 2.86 | | |
| | | | 89.4 | sp | 87.15 | 65 | 57.5 | 2.76 | | 2.81 |
| L6.100 | 1:1.8AAA | 0.40% | 24.9 | sp | | 135 | | 7.20 | | |
| | | | 25.1 | sp | 25.00 | 140 | 137.5 | 8.41 | | 7.81 |
| L6.100 | 1:1.8AAA | 0.50% | 87.2 | sp | | 140 | | 4.51 | | |
| | | | 79 | sp | 83.10 | 155 | 147.5 | 4.61 | | 4.56 |
| L6.100 | 1:1.8AAA | 0.60% | 207.5 | sp | | 164 | | 3.90 | | |
| | | | 162.5 | sp | 185.00 | 170 | 167 | 4.28 | | 4.09 |
| L6.100 | 1:1.8AAA | 0.70% | 196.5 | adh | | 160 | | 3.46 | | |
| | | | 201.8 | adh | 199.15 | 140 | 150 | 3.48 | | 3.47 |
| L6.100 | 1:1.8AAA | 0.80% | 105.4 | adh | | 140 | | 3.40 | | |
| | | | 77.7 | adh | 91.55 | 165 | 152.5 | 3.44 | | 3.42 |

In Table 12B, the term "adh" means adhesive failure.

Example 16

Samples of low Tg polymer L4.100 and L6.100 were subjected to performance testing. All samples were direct coated to 2 mil mylar at 60 gsm+1-3, air dried for 5 min. followed by 10 min. in a 120° C. forced air oven. All samples were conditioned for 24 hours in a controlled climate room. A summary of the samples and results of testing are set forth below in Tables 13A and 13B.

TABLE 13A

Test Results for Samples L4.100 and L6.100

180 DEG PP PEEL

| SAMPLE | AAA | % BOS | 15 MIN | MOF | AVG | 72+ HR | MOF | AVG |
|---|---|---|---|---|---|---|---|---|
| L4.100 | 1:1:8 AAA | 0.40% | 3.74 | sp | | 4.07 | sp | |
| | | | 3.93 | sp | 3.85 | 4.24 | sp | 4.20 |
| | | | 3.87 | sp | | 4.28 | sp | |
| L4.100 | 1:1:8 AAA | 0.50% | 4.20 | sp | | 4.54 | sp | |
| | | | 4.46 | sp | 4.39 | 4.77 | sp | 4.70 |
| | | | 4.50 | sp | | 4.80 | sp | |
| L4.100 | 1:1:8 AAA | 0.60% | 0.82 | zip | | 5.46 | sp | |
| | | | 0.81 | zip | 0.80 | 0.72 | zip | 2.33 |
| | | | 0.78 | zip | | 0.82 | zip | |
| L4.100 | 1:1:8 AAA | 0.70% | 0.77 | zip | | 0.64 | zip | |
| | | | 0.74 | zip | 0.76 | 0.71 | zip | 0.70 |
| | | | 0.76 | zip | | 0.74 | zip | |
| L4.100 | 1:1:8 AAA | 0.80% | 2.16 | | | 2.57 | | |
| | | | 2.46 | | 2.37 | 2.86 | | 2.72 |
| | | | 2.50 | | | 2.72 | | |
| L6.100 | 1:1:8 AAA | 0.40% | 0.48 | zip | | 0.39 | zip | |
| | | | 0.41 | zip | 0.46 | 0.60 | zip | 0.45 |
| | | | 0.49 | zip | | 0.37 | zip | |
| L6.100 | 1:1:8 AAA | 0.50% | 0.45 | zip | | 0.34 | zip | |
| | | | 0.47 | zip | 0.46 | 0.40 | zip | 0.36 |
| | | | 0.47 | zip | | 0.34 | zip | |
| L6.100 | 1:1:8 AAA | 0.60% | 0.41 | zip | | 0.39 | zip | |
| | | | 0.40 | zip | 0.39 | 1.00 | zip | 0.58 |
| | | | 0.36 | zip | | 0.35 | zip | |
| L6.100 | 1:1:8 AAA | 0.70% | 1.46 | sl zip | | 2.54 | | |
| | | | 1.14 | sl zip | 1.478 | 2.33 | | 2.56 |
| | | | 1.84 | sl zip | | 2.77 | | |
| L6.100 | 1:1:8 AAA | 0.80% | 1.94 | | | 2.22 | | |
| | | | 1.68 | | 1.89 | 2.17 | | 2.29 |
| | | | 2.04 | | | 2.47 | | |

TABLE 13B

Test Results for Samples L4.100 and L6.100

180 DEG HDPE PEEL

| SAMPLE | AAA | % BOS | 15 MIN MOF | AVG | 72+ HR MOF | AVG |
|---|---|---|---|---|---|---|
| L4.100 | 1:1:8 AAA | 0.40% | 3.99 sp | | 4.30 sp | |
| | | | 3.96 sp | 4.02 | 4.15 sp | 4.25 |
| | | | 4.12 sp | | 4.31 sp | |
| L4.100 | 1:1:8 AAA | 0.50% | 3.01 p tr | | 4.65 sp | |
| | | | 2.76 p tr | 2.42 | 4.54 sp | 4.65 |
| | | | 1.50 p tr | | 4.75 sp | |

TABLE 13B-continued

Test Results for Samples L4.100 and L6.100

180 DEG HDPE PEEL

| SAMPLE | AAA | % BOS | 15 MIN MOF | AVG | 72+ HR MOF | AVG |
|---|---|---|---|---|---|---|
| L4.100 | 1:1:8 AAA | 0.60% | 0.61 | | 0.73 | |
| | | | 0.69 | 0.65 | 0.80 | 0.73 |
| | | | 0.64 | | 0.65 | |
| L4.100 | 1:1:8 AAA | 0.70% | 0.44 | | 0.51 | |
| | | | 0.38 | 0.42 | 0.67 | 0.59 |
| | | | 0.45 | | 0.58 | |
| L4.100 | 1:1:8 AAA | 0.80% | 0.31 | | 0.36 | |
| | | | 0.25 | 0.28 | 0.43 | 0.39 |
| | | | 0.29 | | 0.38 | |
| L6.100 | 1:1:8 AAA | 0.40% | 0.84 | | 1.21 | |
| | | | 0.87 | 0.90 | 0.95 | 1.03 |
| | | | 1.00 | | 0.93 | |
| L6.100 | 1:1:8 AAA | 0.50% | 0.66 | | 0.65 | |
| | | | 0.60 | 0.62 | 0.83 | 0.71 |
| | | | 0.60 | | 0.64 | |
| L6.100 | 1:1:8 AAA | 0.60% | 0.50 | | 0.64 | |
| | | | 0.43 | 0.48 | 0.64 | 0.61 |
| | | | 0.52 | | 0.55 | |
| L6.100 | 1:1:8 AAA | 0.70% | 0.40 | | 0.48 | |
| | | | 0.44 | 0.40 | 0.41 | 0.46 |
| | | | 0.37 | | 0.48 | |
| L6.100 | 1:1:8 AAA | 0.80% | 0.36 | | 0.33 | |
| | | | 0.35 | 0.34 | 0.36 | 0.34 |
| | | | 0.30 | | 0.34 | |

Example 17

Samples of high Tg polymers H9.150 and H7.150, were subjected to UL testing. All samples were direct coated to foil at 60+/−5 gsm, air dried for 5 min. followed by 120° C. for the designated minutes. All samples were conditioned for 24 hours in a controlled climate room. A summary of the samples and results of testing are set forth below in Tables 14A and 14B.

TABLE 14A

Test Results for Samples H9.150 and H7.150

180 DEG SS PEEL

| SAMPLE | XLINKER | % BOS | 15 MIN | AVG | 24 HR | AVG | 72 HR | AVG |
|---|---|---|---|---|---|---|---|---|
| H9.150 | 1:1:8AAA | 0.40% | 6.4 | | 7.66 | | 8.08 | |
| | | | 5.54 | 5.29 | 6.62 | 6.80 | 6.56 | 6.52 |
| | | | 3.92 | | 6.13 | | 4.91 | |
| H9.150 | 1:1:8AAA | 0.50% | 6.06 | | 7.41 | | 8.3 | |
| | | | 5.78 | 6.07 | 7.34 | 7.44 | 8.27 | 8.24 |
| | | | 6.37 | | 7.57 | | 8.16 | |
| H9.150 | 1:1:8AAA | 0.60% | 5.62 | | 7.58 | | 7.99 | |
| | | | 5.36 | 4.98 | 6.81 | 6.37 | 7.11 | 7.55 |
| | | | 3.82 | | 4.73 | | 7.54 | |
| H7.150 | 1:1:8AAA | 0.50% | 5.95 | | 6.8 | | 7.63 | |
| | | | 5.29 | 5.62 | 6.42 | 6.63 | 7.07 | 7.45 |
| | | | 5.61 | | 6.67 | | 7.65 | |
| H7.150 | 1:1:8AAA | 0.60% | 4.98 | | 5.7 | | 6.56 | |
| | | | 5.19 | 5.00 | 5.81 | 5.69 | 5.98 | 6.25 |
| | | | 4.82 | | 5.57 | | 6.21 | |
| H7.150 | 1:1:8AAA | 0.70% | 3.73 | | 3.56 | | 3.53 | |
| | | | 4.96 | 4.22 | 4.54 | 4.21 | 5.6 | 4.75 |
| | | | 3.98 | | 4.52 | | 5.11 | |

TABLE 14B

Test Results for Samples H9.150 and H7.150

| SAMPLE | XLINKER | % BOS | 1 × 1 × 10 lb | | | 65 C. 1 × 1 × 5 lb SLIP/ | | | 8.8 LB PER SQ IN SHEAR | | |
|---|---|---|---|---|---|---|---|---|---|---|---|
| | | | MIN | SLIP/MOF | AVG | MIN | MOF | AVG | MIN | MOF | AVG |
| H9.150 | 1:1:8AAA | 0.40% | 7200 | .5 mm | | 163.10 | Sp | | 1000 | re | |
| | | | 7200 | .6 mm | 7200.00 | 181.80 | Sp | 175.53 | 1000 | re | 10000.00 |
| | | | 7200 | .6 mm | | 181.70 | sp | | 1000 | re | |
| H9.150 | 1:1:8AAA | 0.50% | 7200 | .4 mm | | 360.00 | .9 mm | | 1000 | re | |
| | | | 7200 | .4 mm | 7200.00 | 360.00 | .9 mm | 360.00 | 1000 | re | 10000.00 |
| | | | 7200 | .4 mm | | 360.00 | .9 mm | | 1000 | re | |
| H9.150 | 1:1:8AAA | 0.60% | 7200 | .3 mm | | 360.00 | .5 mm | | 1000 | re | |
| | | | 7200 | .2 mm | 7200.00 | 360.00 | .4 mm | 360.00 | 1000 | re | 10000.00 |
| | | | 7200 | .2 mm | | 360.00 | .5 mm | | 1000 | re | |
| H7.150 | 1:1:8AAA | 0.50% | 7200 | .3 mm | | 360.00 | .5 mm | | 1000 | re | |
| | | | 7200 | .3 mm | 7200.00 | 360.00 | .5 mm | 360.00 | 1000 | re | 10000.00 |
| | | | 7200 | .3 mm | | 360.00 | .5 mm | | 1000 | re | |
| H7.150 | 1:1:8AAA | 0.60% | 7200 | .1 mm | | 360.00 | .2 mm | | 1000 | re | |
| | | | 7200 | .2 mm | 7200.00 | 360.00 | .2 mm | 360.00 | 1000 | re | 10000.00 |
| | | | 7200 | .1 mm | | 360.00 | .1 mm | | 1000 | re | |
| H7.150 | 1:1:8AAA | 0.70% | 7200 | .2 mm | | 360.00 | .2 mm | | 1000 | re | |
| | | | 7200 | .2 mm | 7200.00 | 360.00 | .2 mm | 360.00 | 1000 | re | 10000.00 |
| | | | 7200 | .2 mm | | 360.00 | .3 mm | | 1000 | re | |

Example 18

Samples of high Tg polymers, i.e., H7.100 and H9.100, were subjected to UL testing. All samples were directed coated to foil at 60+/−5 gsm, air dried for 5 min. followed by 120° C. for the designated minutes. All samples were conditioned for 24 hours in a controlled climate room. A summary of the samples and results of testing are set forth below in Tables 15A and 15B.

TABLE 15A

Test Results for Samples H7.100 and H9.100

| SAMPLE | X-LINKER | % BOS | 180 DEG SS PEEL | | | | | |
|---|---|---|---|---|---|---|---|---|
| | | | 15 MIN | AVG | 24 HR | AVG | 72 HR | AVG |
| H7.100 | 1:1:9AAA | 0.60% | 5.31 | | 6 | | 6.02 | |
| | | | 5.51 | 5.00 | 5.83 | 5.56 | 7.01 | 6.29 |
| | | | 4.19 | | 4.85 | | 5.83 | |
| H7.100 | 1:1:9AAA | 0.70% | 5.04 | | 5.2 | | 6.21 | |
| | | | 3.62 | 4.34 | 5.77 | 5.35 | 6.67 | 6.43 |
| | | | 4.36 | | 5.09 | | 6.41 | |
| H7.100 | 1:1:9AAA | 0.80% | 4.34 | | 4.6 | | 5.13 | |
| | | | 4.57 | 4.19 | 5.78 | 5.00 | 6.2 | 5.48 |
| | | | 3.65 | | 4.63 | | 5.11 | |
| H9.100 | 1:1:9AAA | 0.50% | 6.19 | | 6.84 | | 6.71 | |
| | | | 5.12 | 5.77 | 6.43 | 6.96 | 6.96 | 7.09 |
| | | | 6.01 | | 7.6 | | 7.61 | |
| H9.100 | 1:1:9AAA | 0.60% | 6.2 | | 6.41 | | 5.89 | |
| | | | 5.59 | 5.67 | 6.46 | 6.27 | 7.25 | 6.44 |
| | | | 5.23 | | 5.95 | | 6.19 | |
| H9.100 | 1:1:9AAA | 0.70% | 5.63 | | 6.97 | | 7.15 | |
| | | | 6.06 | 6.00 | 7.01 | 7.08 | 7.16 | 7.30 |
| | | | 6.32 | | 7.27 | | 7.58 | |

TABLE 15B

Test Results for Samples H7.100 and H9.100

| SAMPLE | X-LINKER | % BOS | 1 × 1 × 10 lb | | | 1 × 1 × 5 lb 65 DEG Shears | | | 8.8 LB PER SQ IN SHEAR | | |
|---|---|---|---|---|---|---|---|---|---|---|---|
| | | | MIN | MOF | AVG | MIN | MOF | AVG | MIN | MOF | AVG |
| H7.100 | 1:1:9AAA | 0.60% | 6000+ | N/A | | 360.00 | .1 mm | | 1000 | re | |
| | | | 6000+ | | 6000.00 | 360.00 | .1 mm | 360.00 | 1000 | re | 10000.00 |
| | | | 6000+ | | | 360.00 | .1 mm | | 1000 | re | |
| H7.100 | 1:1:9AAA | 0.70% | 6000+ | | | 360.00 | .1 mm | | 4134.7 | ltst | |
| | | | 6000+ | | 6000.00 | 360.00 | .1 mm | 360.00 | 1000 | re | 8044.90 |
| | | | 6000+ | | | 360.00 | .2 mm | | 1000 | re | |
| H7.100 | 1:1:9AAA | 0.80% | 6000+ | | | 360.00 | .1 mm | | 1273.1 | ltst | |
| | | | 6000+ | | 6000.00 | 360.00 | .1 mm | 360.00 | 418.9 | ltst | 3897.33 |
| | | | 6000+ | | | 360.00 | .2 mm | | 10000 | re | |
| H9.100 | 1:1:9AAA | 0.50% | 7200.00 | .3 mm | | 360.00 | .5 mm | | 10000 | re | |
| | | | 7200.00 | .4 mm | 7200.00 | 360.00 | .5 mm | 360.00 | 10000 | re | 10000.00 |
| | | | 7200.00 | .3 mm | | 360.00 | .5 mm | | 10000 | re | |

TABLE 15B-continued

Test Results for Samples H7.100 and H9.100

| SAMPLE | X-LINKER | % BOS | 1 × 1 × 10 lb MIN | MOF | AVG | 1 × 1 × 5 lb 65 DEG Shears MIN | MOF | AVG | 8.8 LB PER SQ IN SHEAR MIN | MOF | AVG |
|---|---|---|---|---|---|---|---|---|---|---|---|
| H9.100 | 1:1:9AAA | 0.60% | 7200.00 | .3 mm | | 360.00 | .3 mm | | 10000 | re | |
| | | | 7200.00 | .2 mm | 7200.00 | 360.00 | .2 mm | 360.00 | 10000 | re | 10000.00 |
| | | | 7200.00 | .2 mm | | 360.00 | .2 mm | | 10000 | re | |
| H9.100 | 1:1:9AAA | 0.70% | 7200.00 | .1 mm | | 360.00 | .2 mm | | 10000 | re | |
| | | | 7200.00 | .2 mm | 7200.00 | 360.00 | .2 mm | 360.00 | 10000 | re | 10000.00 |
| | | | 7200.00 | .1 mm | | 360.00 | .2 mm | | 10000 | re | |

In Tables 15B and other tables, the term "lt st" refers to light stain.

Example 19

Samples of low Tg polymers L4.100 and L6.100 were subjected to various benchmarking trials. All experimental samples were direct coated to 2 mil mylar at 60+/−5 gsm, air dried for 5 min. followed by 120° C. for the designated minutes. All samples were conditioned for 24 hours in a controlled climate room. A summary of the samples and results of the trials are set forth below in Tables 16A and 16B.

TABLE 16A

Test Results for Samples L4.100 and L6.100

| Polymer | AAA Level | 15 MIN | MOF | AGED | MOF | AGED | MOF | AGED | MOF | AGED | MOF |
|---|---|---|---|---|---|---|---|---|---|---|---|
| L4.100 | 0.0% | 5.56 | sp | 5.76 | sp | 0.59 | | 0.7 | zip | 1.05 | |
| L4.100 | 0.80% | 2.64 | | 6.21 | sp | 0.39 | | 2.72 | | 0.42 | |
| L6.100 | 0.60% | 5.96 | ptr | 6.95 | sp | 0.61 | | 0.58 | zip | 0.9 | |
| L6.100 | 0.70% | 3.01 | | 9.07 | sp | 0.45 | | 2.56 | | 0.52 | |

TABLE 16B

Test Results for Samples L4.100 and L6.100

| POLYMER | AAA Level | SS LOOP-TACK 15 MIN | ROLLING BALL VALUE (mm) | 8.8 LB PER SQ IN MIN |
|---|---|---|---|---|
| L4.100 | 0.70% | 4.61 | 50.0 | 56.25 |
| L4.100 | 0.80% | 2.81 | 57.5 | 87.15 |
| L6.100 | 0.60% | 4.09 | 167.0 | 185.00 |
| L6.100 | 0.70% | 3.47 | 150.0 | 199.15 |

Example 20

Samples of high Tg polymers H9.150 and H7.150 were subjected to various benchmarking trials. All samples were directed coated to foil at 60+/−5 gsm, air dried for 5 min. followed by 120° C. for the designated minutes. All samples were conditioned for 24 hours in a controlled climate room. A summary of the samples and results of benchmarking are set forth below in Tables 17A and 17B.

TABLE 17A

Comparative Test Results for Samples H9.150 and H7.150

| SAMPLE | XLINKER | % BOS | 180 DEG SS PEEL 15 MIN | AVG | 24 HR | AVG | 72 HR | AVG | 1 × 1 × 10 lb MIN | SLIP/MOF | AVG |
|---|---|---|---|---|---|---|---|---|---|---|---|
| H9.150 | 1:1:8AAA | 0.60% | 4.51 | | 6.54 | | 7.23 | | 10000 | .2 mm | |
| | | | 4.3 | 4.34 | 6.33 | 6.20 | 7.17 | 6.42 | 10000 | .2 mm | 10000.00 |
| | | | 4.22 | | 5.72 | | 4.85 | | 10000 | .1 mm | |
| H7.150 | 1:1:8AAA | 0.60% | 3.97 | | 5.71 | | 6.27 | | 10000 | .2 mm | |
| | | | 3.36 | 3.51 | 5.27 | 5.31 | 6 | 5.83 | 10000 | .2 mm | 10000.00 |
| | | | 3.2 | | 4.96 | | 5.21 | | 10000 | .2 mm | |

TABLE 17A-continued

Comparative Test Results for Samples H9.150 and H7.150

| SAMPLE | XLINKER | % BOS | 180 DEG SS PEEL | | | | | | 1 x 1 x 10 lb | | |
|---|---|---|---|---|---|---|---|---|---|---|---|
| | | | 15 MIN | AVG | 24 HR | AVG | 72 HR | AVG | MIN | SLIP/MOF | AVG |
| Venture tape 1581A | | | 3.37 | | 5.05 | | 5.46 | | 196.00 | ltst | |
| | | | 3.45 | 3.53 | 5.17 | 5.19 | 5.59 | 5.60 | 268.10 | ltst | 242.33 |
| | | | 3.77 | | 5.36 | | 5.74 | | 262.90 | ltst | |
| Shurtape AF 912 | | | 6.3 | | 7.13 | | 7.61 | | 126.30 | ltsp | |
| | | | 5.35 | 5.62 | 6.44 | 6.61 | 6.79 | 7.03 | 125.50 | ltsp | 126.03 |
| | | | 5.22 | | 6.25 | | 6.68 | | 126.30 | ltsp | |
| Shurtape AF 100 | | | 3.66 | | 4.81 | | 5.14 | | 4148.50 | sp | |
| | | | 3.74 | 3.71 | 5.07 | 5.02 | 5.64 | 5.31 | 2462.00 | sp | 4603.50 |
| | | | 3.73 | | 5.17 | | 5.14 | | 7200.00 | .1 mm | |
| Fasson 181 AP | | | 3.66 | | 3.67 | | 5.41 | | 655.10 | ltst | |
| | | | 3.63 | 4.20 | 4.3 | 4.60 | 4.59 | 5.21 | 1641 | ltst | 1376.80 |
| | | | 5.32 | | 5.83 | | 5.62 | | 1834.3 | ltst | |
| Shurtape DC 181 | | | 2.02 | | 3.21 | | 4.22 | | 53.5 | ltsp | |
| | | | 1.57 | 1.71 | 3.43 | 3.31 | 3.72 | 4.82 | 62.5 | ltsp | 71.67 |
| | | | 1.54 | | 3.29 | | 6.52 | | 99 | ltsp | |
| Polyken 339 | | | 3.66 | | 5.19 | | 5.67 | | | N/A | |
| | | | 3.80 | 3.70 | 4.59 | 4.83 | 4.07 | 4.95 | | | N/A |
| | | | 3.65 | | 4.72 | | 5.11 | | | | |

TABLE 17B

Comparative Test Results for Samples H9.150 and H7.150

| SAMPLE | X-LINKER | % BOS | 1 x 1 x 5 lb | | | 8.8 LB PER SQ IN SHEAR | | |
|---|---|---|---|---|---|---|---|---|
| | | | MIN | SLIP/MOF | AVG | MIN | MOF | AVG |
| H9.150 | 1:1:8AAA | 0.60% | 360.00 | .3 mm | | 10000 | re | |
| | | | 360.00 | .2 mm | 360.00 | 10000 | re | 10000.00 |
| | | | 360.00 | .3 mm | | 10000 | re | |
| H7.150 | 1:1:8AAA | 0.60% | 360.00 | .5 mm | | 10000 | re | |
| | | | 360.00 | .4 mm | 360.00 | 10000 | re | 10000.00 |
| | | | 360.00 | .5 mm | | 10000 | re | |
| Venture tape 1581A | | | 71.20 | pop | | 49 | ltst | |
| | | | 33.90 | pop | 39.40 | 41.5 | ltst | 45.25 |
| | | | 13.10 | pop | | | | |
| Shurtape AF 912 | | | 24.00 | ltsp | | 5287.1 | ltsp | |
| | | | 14.80 | ltsp | 17.57 | 10000 | re | 7643.55 |
| | | | 13.90 | .ltsp | | | | |
| Shurtape AF 100 | | | 360.00 | .2 mm | | 215.7 | pop | |
| | | | 360.00 | .1 mm | 360.00 | 193.3 | pop | 204.50 |
| | | | 360.00 | .2 mm | | | | |
| Fasson 181 AP | | | 360 | .2 mm | | 808.6 | ltst | |
| | | | 360 | .2 mm | 360.00 | 10000 | re | 5404.30 |
| | | | 360 | .2 mm | | | | |
| Shurtape DC 181 | | | 118.5 | sp | | 727 | ltsp | |
| | | | 91.4 | sp | 106.63 | 49.7 | ltsp | 61.20 |
| | | | 110.00 | sp | | | | |
| Polyken 339 | | | 31.8 | pop | | 81 | pop | |
| | | | 52.30 | pop | 32.40 | 43.4 | pop | 62.20 |
| | | | 13.10 | pop | | | | |

In Table 17B and other tables, the term "pop" refers to quick adhesive failure.

Example 21

Samples of high Tg polymers H9.100 and H7.100, were subjected to additional benchmarking trials. All samples were direct coated to foil at 60+/−5 gsm, air dried for 5 min followed by 120° C. for the designated minutes. All samples were conditioned for 24 hours in a controlled climate room. A summary of the samples and results of benchmarking are set forth below in Tables 18A and 18B

TABLE 18A

Comparative Test Results for Samples H9.100 and H7.100

| | | | 180 DEG SS PEEL | | | | | | 1 × 1 × 10 lb | | |
|---|---|---|---|---|---|---|---|---|---|---|---|
| SAMPLE | X-LINKER | % BOS | 15 MIN | AVG | 24 HR | AVG | 72 HR | AVG | MIN | SLIP/MOF | AVG |
| H9.100 | 1:1:8AAA | 0.70% | 5.63 | | 6.97 | | 7.15 | | 7200 | .1 mm | |
| | | | 6.06 | 6.00 | 7.01 | 7.08 | 7.16 | 7.30 | 7200 | .2 mm | 7200.00 |
| | | | 6.32 | | 7.27 | | 7.58 | | 7200 | .1 mm | |
| H7.100 | 1:1:8AAA | 0.80% | 4.34 | | 4.6 | | 5.13 | | 6000+ | n/a | |
| | | | 4.57 | 4.19 | 5.78 | 5.00 | 6.2 | 5.48 | 6000+ | n/a | n/a |
| | | | 3.65 | | 4.63 | | 5.11 | | 6000+ | n/a | |
| | Venture tape 1581A | | 3.37 | | 5.05 | | 5.46 | | 196.00 | ltst | |
| | | | 3.45 | 3.53 | 5.17 | 5.19 | 5.59 | 5.60 | 268.10 | ltst | 242.33 |
| | | | 3.77 | | 5.36 | | 5.74 | | 262.90 | ltst | |
| | Shurtape AF 912 | | 6.3 | | 7.13 | | 7.61 | | 126.30 | ltsp | |
| | | | 5.35 | 5.62 | 6.44 | 6.61 | 6.79 | 7.03 | 125.50 | ltsp | 126.03 |
| | | | 5.22 | | 6.25 | | 6.68 | | 126.30 | ltsp | |
| | Shurtape AF 100 | | 3.66 | | 4.81 | | 5.14 | | 4148.50 | sp | |
| | | | 3.74 | 3.71 | 5.07 | 5.02 | 5.64 | 5.31 | 2462.00 | sp | 4603.50 |
| | | | 3.73 | | 5.17 | | 5.14 | | 7200.00 | .1 mm | |
| | Fasson 181 AP | | 3.66 | | 3.67 | | 5.41 | | 655.10 | ltst | |
| | | | 3.63 | 4.20 | 4.3 | 4.60 | 4.59 | 5.21 | 1641 | ltst | 1376.80 |
| | | | 5.32 | | 5.83 | | 5.62 | | 1834.3 | ltst | |
| | Shurtape DC 181 | | 2.02 | | 3.21 | | 4.22 | | 53.5 | ltsp | |
| | | | 1.57 | 1.71 | 3.43 | 3.31 | 3.72 | 4.82 | 62.5 | ltsp | 71.67 |
| | | | 1.54 | | 3.29 | | 6.52 | | 99 | ltsp | |
| | Polyken 339 | | 3.66 | | 5.19 | | 5.67 | | | N/A | |
| | | | 3.80 | 3.70 | 4.59 | 4.83 | 4.07 | 4.95 | | | n/a |
| | | | 3.65 | | 4.72 | | 5.11 | | | | |

TABLE 18B

Comparative Test Results for Samples H9.100 and H7.100

| | | | 1 × 1 × 5 lb | | | 8.8 LB PER SQ IN SHEAR | | |
|---|---|---|---|---|---|---|---|---|
| SAMPLE | X-LINKER | % BOS | MIN | SLIP/MOF | AVG | MIN | MOF | AVG |
| H9.100 | 1:1:8AAA | 0.70% | 360.00 | .2 mm | | 10000 | re | |
| | | | 360.00 | .2 mm | 360.00 | 10000 | re | 7200.00 |
| | | | 360.00 | .2 mm | | 10000 | re | |
| H7.100 | 1:1:8AAA | 0.80% | 360.00 | .1 mm | | 1273.1 | ltst | |
| | | | 360.00 | .1 mm | 360.00 | 418.9 | ltst | 3897.33 |
| | | | 360.00 | .1 mm | | 10000 | re | |
| | Venture tape 1581A | | 71.20 | pop | | 49 | ltst | |
| | | | 33.90 | pop | 39.40 | 41.5 | ltst | 45.25 |
| | | | 13.10 | pop | | | | |
| | Shurtape AF 912 | | 24.00 | ltsp | | 5287.1 | ltsp | |
| | | | 14.80 | ltsp | 17.57 | 10000 | re | 7643.55 |
| | | | 13.90 | .ltsp | | | | |
| | Shurtape AF 100 | | 360.00 | .2 mm | | 215.7 | pop | |
| | | | 360.00 | .1 mm | 360.00 | 193.3 | pop | 204.50 |
| | | | 360.00 | .2 mm | | | | |
| | Fasson 181 AP | | 360 | .2 mm | | 808.6 | ltst | |
| | | | 360 | .2 mm | 360.00 | 10000 | re | 5404.30 |
| | | | 360 | .2 mm | | | | |
| | Shurtape DC 181 | | 118.5 | sp | | 727 | ltsp | |
| | | | 91.4 | sp | 106.63 | 49.7 | ltsp | 61.20 |
| | | | 110.00 | sp | | | | |
| | Polyken 339 | | 31.8 | pop | | 81 | pop | |
| | | | 52.30 | pop | 32.40 | 43.4 | pop | 62.20 |
| | | | 13.10 | pop | | | | |

Example 22

Samples of High Tg polymer, i.e., H9.150, were subjected to accelerated heat aging. Specifically, the samples were subjected to one (1) week exposure to 65° C. All samples were direct coated to 2 mil mylar at 60+/−5 gsm, air dried for 5 min. followed by 120° C. for the designated minutes. All samples were conditioned for 24 hours in a controlled climate room. A summary of the samples and results of testing are set below in Table 19.

TABLE 19

Comparative Test Results for Samples H9.150 and H7.150

| SAMPLE | XLINKER | % BOS | 180 DEG SS PEEL | | | | | | 8.8 LB PER SQ IN SHEAR | | |
|---|---|---|---|---|---|---|---|---|---|---|---|
| | | | 15 MIN | AVG | 24 HR | AVG | 72 HR | AVG | MIN | MOF | AVG |
| H9.150 AGED | 1:3:9 AAA | 0.40% | 4.52 4.37 4.67 | 4.52 | 5.08 5 5.06 | 5.05 | 6.11 5.97 6.01 | 6.03 | 10000 10000 10000 | | 10000.00 |
| H9.150 CONTROL | 1:3:9 AAA | 0.40% | 3.77 3.97 3.24 | 3.66 | 5.47 5.46 4.81 | 5.25 | 5.92 5.54 5.48 | 5.65 | 10000 10000 10000 | | 10000.00 |

The "control" in Table 19 is H9.150 not heat aged.

Example 23

Additional samples of high Tg polymer, i.e., H9.150, were subjected to accelerated heat aging. All samples were direct coated to 2 mil mylar at 60+/−5 gsm, air dried for 5 min. followed by 120° C. for the designated minutes. All samples were conditioned accordingly. A summary of the samples and results of testing are set forth below in Table 20.

TABLE 20

Test Results for Sample H9.150

| SAMPLE | AAA DWELL | % BOS | 180 DEG SS PEEL | | | | | | 8.8 LB PER SQ IN SHEAR | |
|---|---|---|---|---|---|---|---|---|---|---|
| | | | 15 MIN | AVG | 24 HR | AVG | 72 HR | AVG | MIN | AVG |
| H9.150 | 24 HR CONTROL | 0.20% | 5.16 4.56 4.98 | 4.90 | 6.1 5.78 6.12 | 6.00 | 6.24 6.12 6.4 | 6.25 | 10000 10000 10000 | 10000.00 |
| H9.150 | Tappi room dwell | 0.20% | 4.68 3.97 4.35 | 4.33 | 6.58 5.39 5.77 | 5.91 | 6.62 6.34 5.52 | 6.16 | 10000 10000 10000 | 10000.00 |
| H9.150 | 60° oven dwell | 0.20% | 5.1 4.45 5.12 | 4.89 | 5.13 5.8 5.73 | 5.55 | 7.08 6.31 5.42 | 6.27 | 10000 10000 10000 | 10000.00 |

Many other benefits will not doubt become apparent from future application and development of this technology.

All patents, applications, and articles noted herein are hereby incorporated by reference in their entirety.

As described hereinabove, the present subject matter solves many problems associated with previously known compositions and methods. However, it will be appreciated that various changes in the details, materials and arrangements of components and/or operations, which have been herein described and illustrated in order to explain the nature of the subject matter, may be made by those skilled in the art without departing from the principle and scope of the subject matter as expressed in the appended claims.

What is claimed is:

1. An acrylic polymer comprising:
   at least one acrylic block copolymer comprising
   two first reactive segments A of controlled molecular weight and position comprising at least one monomer comprising a functional group selected from the group consisting of a self reactive functional group, a reactive functional group, and combinations thereof; and
   one second reactive segment B of controlled molecular weight and position comprising at least one monomer comprising a reactive functional group,
   wherein the first reactive segments A and the second reactive segment B comprise a copolymer derived from (i) one or more monomers comprising nonreactive functional groups and (ii) at least one polymerizable comonomer comprising crosslinkable functionality,
   wherein the first reactive segments A comprises at least one monomer comprising a self reactive functional group,
   wherein the self reactive functional group is selected from the group consisting of silyl, anhydrides, epoxies, alkoxymethylol, and cyclic ethers, and
   wherein the segments A are positioned on either side of the middle segment B on the polymer chain to define an ABA structure.

2. The acrylic polymer of claim 1 wherein the self reactive functional group is an epoxy.

3. The acrylic polymer of claim 1 wherein the reactive functional group is selected from the group consisting of acids, hydroxyls, amines, and thiols.

4. The acrylic polymer of claim 3 wherein the reactive functional group is an acid.

5. The acrylic polymer of claim 1 wherein the polymer has a polydispersity of less than 4.0.

6. The acrylic polymer of claim 1 wherein the polymer has a polydispersity of less than 3.5.

7. The acrylic polymer of claim 1 wherein the polymer has a polydispersity of less than 3.0.

8. The acrylic polymer of claim 1 wherein the polymer has a polydispersity of less than 2.5.

9. The acrylic polymer of claim 1 wherein the polymer has a polydispersity of less than 2.0.

10. The acrylic polymer of claim 1 wherein the polymer has a number average molecular weight (Mn) within the range of from about 40,000 to about 150,000.

11. The acrylic polymer of claim 10 wherein the polymer has a number average molecular weight (Mn) within the range of from about 50,000 to about 110,000.

12. A pressure sensitive adhesive composition comprising:
at least one acrylic block copolymer comprising
two first reactive segments A of controlled molecular weight and position comprising at least one monomer comprising a functional group selected from the group consisting of a self reactive functional group, a reactive functional group, and combinations thereof; and
one second reactive segment B of controlled molecular weight and position comprising at least one monomer comprising a reactive functional group; and
a crosslinking agent,
wherein the first reactive segments A and the second reactive segment B comprise a copolymer derived from (i) one or more monomers comprising non reactive functional groups and (ii) at least one polymerizable comonomer comprising crosslinkable functionality,
wherein the first reactive segments A comprises at least one monomer comprising a self reactive functional group,
wherein the self reactive functional group is selected from the group consisting of silyl, anhydrides, epoxies, alkoxymethylol, and cyclic ethers, and
wherein the segments A are positioned on either side of the middle segment B on the polymer chain to define an ABA structure.

13. The adhesive composition of claim 12 further comprising:
at least one agent selected from the group consisting of pigments, fillers, plasticizers, diluents, antioxidants, tackifiers, polymeric additives, and combinations thereof.

14. A method of preparing a pressure sensitive adhesive composition comprising:
polymerizing using a controlled radical polymerization process at least one monomer comprising a functional group selected from the group consisting of a self reactive functional group, a reactive functional group, and combinations thereof to thereby form two first reactive segments A of controlled molecular weight and position;
polymerizing using a controlled radical polymerization process at least one monomer comprising a reactive functional group to thereby form one second reactive segment B of controlled molecular weight and position;
wherein at least one of the first reactive segments A and the second reactive segment B comprises an acrylate group;
forming an acrylic polymer from the first reactive segments A and the second reactive segment B;
crosslinking the acrylic polymer by mixing the acrylic polymer with an amount of a crosslinking agent;
wherein the first reactive segments A and the second reactive segment B comprise a copolymer derived from (i) one or more monomers comprising nonreactive functional groups and (ii) at least one polymerizable comonomer comprising crosslinkable functionality,
wherein the first reactive segments A comprises at least one monomer comprising a self reactive functional group,
wherein the self reactive functional group is selected from the group consisting of silyl, anhydrides, epoxies, alkoxymethylol, and cyclic ethers, and
wherein the segments A are positioned on either side of the middle segment B on the polymer chain to define an ABA structure.

15. The method of claim 14 wherein at least one of the first reactive segment and the second reactive segment is polymerized in the presence of a RAFT agent.

16. The method of claim 14 wherein at least one of the first reactive segment and the second reactive segment is polymerized in the presence of an SFRP agent.

17. The method of claim 14 further comprising the step of crosslinking the functional groups of the reactive segments.

18. The acrylic polymer of claim 1 wherein the one or more monomers comprising nonreactive functional groups are derived from acrylates, methacrylates, or mixtures thereof.

19. The acrylic polymer of claim 1 wherein the one or more monomers comprising nonreactive functional groups are derived from $C_1$ to about $C_{20}$ alkyl, aryl, or cyclic acrylates, $C_1$ to about $C_{20}$ alkyl, aryl, or cyclic methacrylates, or mixtures thereof.

20. The acrylic polymer of claim 1 wherein the first second reactive segment comprise at least one monomer comprising the formula (II):

(II)

where $R_3$ is H or $CH_3$ and $R_4$ is a branched or unbranched, saturated alkyl group comprising 4 to 14 carbon atoms.

21. The acrylic polymer of claim 1 wherein the first and second reactive segment comprise at least one monomer derived from the formula (I):

(I)

where R is H or $CH_3$ and X comprises a functional group capable of crosslinking,
wherein the functional group comprises at least one functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

22. The acrylic polymer of claim 1 wherein the first reactive segment and the second reactive segment are molecularly miscible before cure as expressed by their properties in the bulk state that are indicative of a single phase behavior.

23. The acrylic polymer of claim 1 wherein the one or more monomers comprising nonreactive functional groups is the same type of monomer present in both the first and second reactive segments.

24. An acrylic polymer comprising:
at least one acrylic block copolymer comprising two first reactive segments A of controlled molecular weight and position that comprises at least one monomer comprising a functional group selected from the group consisting of a self reactive functional group, a reactive functional group, and combinations thereof; and one second reactive segments B of controlled molecular weight and position that comprises at least one monomer comprising a reactive functional group, wherein the first reactive segments A comprises at least one monomer comprising a self reactive functional group, and wherein the first reactive segments A and the second reactive segment B comprise a copolymer derived from (l) one or more monomers comprising nonreactive functional groups and (ii) at least one polyrnerizable comonorner comprising crosslinkable functionality, wherein the reactive functional group is selected from the group consisting of acids, hydroxyls, amines, and thiols, and Wherein the segments A are positioned on either side of the middle segment B on the polymer chain to define an ABA structure.

25. An acrylic polymer comprising:

at least one acrylic block copolymer comprising a first reactive segment of controlled molecular weight and position that comprises at least one monomer comprising a functional group selected from the group consisting of a self reactive functional group, a reactive functional group, and combinations thereof; and a second reactive segment of controlled molecular weight and position that comprises at least one monomer comprising a reactive functional group, wherein the first reactive segment and the second reactive segment comprise a copolymer derived from (i) one or more monomers comprising nonreactive functional groups and (ii) at least one polymerizable comonorner comprising crossiinkabie functionality, wherein the first reactive segment and the second reactive segment are molecularly miscible before cure, wherein the first reactive segment comprises at least one monomer comprising a self reactive functional group, and wherein the self reactive functional group is selected from the group consisting of silyl, anhydrides, epoxies, alkoxymethylol, and cyclic ethers.

* * * * *